US012762644B2

(12) United States Patent
McCool et al.

(10) Patent No.: US 12,762,644 B2
(45) Date of Patent: Oct. 13, 2026

(54) GENERATING TWO-DIMENSIONAL VIEWS FOR TWO-DIMENSIONAL CLASH DETECTION

(71) Applicant: Procore Technologies, Inc., Carpinteria, CA (US)

(72) Inventors: David McCool, Carpinteria, CA (US); Ritu Parekh, San Jose, CA (US); Christopher Myers, Council, ID (US)

(73) Assignee: Procore Technologies, Inc., Carpinteria, CA (US)

( * ) Notice: Subject to any disclaimer, the term of this patent is extended or adjusted under 35 U.S.C. 154(b) by 368 days.

(21) Appl. No.: 18/365,186

(22) Filed: Aug. 3, 2023

(65) Prior Publication Data

US 2025/0045864 A1 Feb. 6, 2025

(51) Int. Cl.

| | |
|---|---|
| ***G06T 17/00*** | (2006.01) |
| ***G06Q 50/08*** | (2012.01) |
| ***G06T 3/067*** | (2024.01) |
| ***G06T 7/13*** | (2017.01) |
| ***G06V 10/764*** | (2022.01) |

(52) U.S. Cl.

CPC ............ *G06T 3/067* (2024.01); *G06Q 50/08* (2013.01); *G06T 7/13* (2017.01); *G06T 17/00* (2013.01); *G06V 10/764* (2022.01); *G06T 2210/21* (2013.01)

(58) Field of Classification Search

None

See application file for complete search history.

(56) References Cited

U.S. PATENT DOCUMENTS

| | | | | |
|---|---|---|---|---|
| 10,745,003 B2 * | 8/2020 | Kentley-Klay | ... | B60W 30/0953 |
| 10,943,038 B1 * | 3/2021 | McCool | .................. | G06T 19/20 |
| 11,086,294 B2 * | 8/2021 | Grafen | .................. | B33Y 50/00 |

(Continued)

OTHER PUBLICATIONS

Rossignac, Jarek; Interactive Inspection of Solids: Cross-sections and Interferences; Jul. 1992; ACM SIGGRAPH Computer Graphics, vol. 26; p. 353-360; https://dl.acm.org/doi/pdf/10.1145/142920.134092 (Year: 1992).*

(Continued)

*Primary Examiner* — Joni Hsu

(74) *Attorney, Agent, or Firm* — Lee Sullivan Shea & Smith LLP

(57) ABSTRACT

Techniques for facilitating automated two-dimensional (2D) clash detection on objects displayed within a 2D view generated from a three-dimensional (3D) model of a construction project involve (1) tracing an intersection of (i) a cross-sectional plane and (ii) two or more objects in the 3D model, (2) based on tracing the intersection, determining respective 2D boundaries of the two or more objects, (3) generating a cross-sectional 2D view that depicts the intersection and includes representations of the respective 2D boundaries of the objects in the 2D view, (4) causing an end-user device to present one or more user interface views for receiving user input indicating a clash detection scope, (5) based on data defining the clash detection scope, identifying any clashes between objects displayed in the generated 2D view, and (6) causing a respective indication of each identified clash to be displayed at the end-user device.

20 Claims, 11 Drawing Sheets

(56) References Cited

U.S. PATENT DOCUMENTS

| | | | | |
|---|---|---|---|---|
| 2016/0348057 | A1* | 12/2016 | Nomura | G06V 20/695 |
| 2020/0237441 | A1* | 7/2020 | Zuhars | A61B 34/20 |

OTHER PUBLICATIONS

Hu, Zhiqi; Geometry Updating for Digital Twins of Buildings: A Review to Derive a New Geometry-Based Object Class Hierarchy; Jul. 2022; 2022 European Conference on Computing in Construction; p. 1-6; https://ec-3.org/publications/conferences/EC32022/papers/EC32022_155.pdf (Year: 2022).*

Abioye, Sofiat O. et al., “Artificial Intelligence in the Construction Industry: A Review of Present Status, Opportunities and Future Challenges”, Journal of Building Engineering, vol. 44, Oct. 5, 2021, 13 pages.

* cited by examiner

GENERATING TWO-DIMENSIONAL VIEWS FOR TWO-DIMENSIONAL CLASH DETECTION

BACKGROUND

Construction projects are complex undertakings that involve intensive planning, design, and implementation throughout several discrete construction phases. For instance, a construction project typically commences with a design phase, where architects design the overall shape and layout of a construction project, such as a building. Next, engineers engage in a planning phase where they take the architects' designs and produce engineering drawings and plans for the construction of the project. At this stage, engineers may also design various portions of the project's infrastructure, such as HVAC (heating, ventilation, and air conditioning), plumbing, electrical, etc., and produce plans reflecting these designs as well. After, or perhaps in conjunction with, the planning phase, contractors may engage in a logistics phase to review these plans and begin to allocate various resources to the project, including determining what materials to purchase, scheduling delivery, and developing a plan for carrying out the actual construction of the project. Finally, during a construction phase, construction professionals begin to construct the project based on the finalized plans.

Certain phases of a construction project may involve reviewing various construction project data to identify and resolve conflicts, such as conflicts within designs and/or plans of the construction project, which can be time-consuming, cumbersome, and error-prone. Thus, improvements in software technology for facilitating such endeavors is desirable.

OVERVIEW

At certain stages in a construction project's lifecycle, such as prior to beginning the construction phase, construction professionals typically engage in a rigorous review of construction project design information in order to resolve conflicts that may give rise to issues during construction. One such type of conflict is an object clash. An object clash occurs when two or more designed objects of a construction project occupy the same space, such as piping that is inadvertently routed through ductwork, as one example. Ideally, such clashes are identified before construction through a process known as "clash detection."

In general, design information for a construction project is embodied in a visual representation (e.g., a set of drawings) that visually communicates information about the construction project, such as what the project is to look like and/or how the project is to be assembled or constructed. Such visual representations may take various forms. For instance, as one example, a visual representation of a construction project may take the form of a two-dimensional ("2D") technical drawing, such as an architectural drawing or a construction blueprint, in which two-dimensional line segments of the drawing represent certain physical elements of the construction project, like walls, pipes, and ducts. In this respect, a two-dimensional technical drawing could be embodied either in paper form or in a computerized form, such as an image file (e.g., a PDF, JPEG, etc.). Advantageously, 2D drawings are often set out in a universally recognized format that most, if not all, construction professionals can read and understand. Further, 2D drawings are designed to be relatively compact, with one drawing being arranged to fit on a single piece of paper or in a computerized file format that requires minimal processing power and computer storage to view (e.g., a PDF viewer, JPEG viewer, etc.).

As another example, a visual representation of a construction project may take the form of a three-dimensional (3D) model embodied in a computerized form, such as in a building information model (BIM) file. There are many ways for a BIM file to arrange and store data that describes attributes of individual physical elements of a construction project. In one specific example, a BIM file may contain data that represents each individual physical object in a construction project (e.g. each pipe, each duct, each wall, etc.) as a respective set of geometric triangles (e.g., a triangular irregular network, or TIN) such that when the geometric triangles are visually stitched together by BIM viewer software, the triangles form a mesh (e.g., a surface) that represents a scaled model of the individual physical object.

In this respect, the BIM file may contain data that represents each triangle of a given mesh as a set of coordinates in three-dimensional space ("3D-space"). For instance, for each triangle stored in the BIM file, the BIM file may contain data describing the coordinates of each vertex of the triangle (e.g., an x-coordinate, a y-coordinate, and a z-coordinate for the first vertex of the triangle; an x-coordinate, a y-coordinate, and a z-coordinate for the second vertex of the triangle; and an x-coordinate, a y-coordinate, and a z-coordinate for the third vertex of the triangle). A given mesh may be comprised of thousands, tens of thousands, or even hundreds of thousands of individual triangles, where each triangle may have a respective set of three vertices and corresponding sets of 3D-space coordinates for those vertices.

A BIM file may contain data that represents each individual physical object in a construction project in other ways as well.

Specialized BIM software is configured to access a BIM file and render a three-dimensional model of the construction project that is viewable from one or more perspectives. Advantageously, a three-dimensional model may provide a more comprehensive overview of the construction project by conceptualizing information in a single three-dimensional view that would otherwise be spread across multiple two-dimensional drawings. In addition, the BIM software allows a construction professional to navigate through the three-dimensional model and view and/or focus on elements of interest, such as a particular wall or duct.

However, while 3D models typically provide a more comprehensive representation of information about a construction project, identifying and/or viewing object clashes in a 3D model can pose certain challenges. For example, 3D models are very elaborate and comprise a vast amount of detailed information, and as a result, navigating a 3D model can sometimes be overwhelming. For instance, due to the amount of information that is typically included in a 3D model, it can be difficult to focus on particular areas of interest or clashes between particular items of interest within the 3D model. Further, it can be difficult for a construction professional to navigate a 3D model, particularly to identify and/or view clashes, in instances where the construction professional is using a computing device with a relatively small display surface (e.g., a smartphone, a tablet, etc.).

On the other hand, many types of object clashes are more easily identified and understood in a 2D representation than in a 3D representation of a construction project. For instance, it is common to undertake a clash detection analysis along a particular edge of an object that intersects with one or more other objects, such as along an edge (e.g., a top edge) of a floor slab, or along a face of a wall, or along a ceiling of a room, among other examples. Clashes along these types of edges can be difficult to identify and visualize in a 3D representation, as will be explained in more detail further below.

As yet another example, it is often easier and more intuitive to navigate a 2D view in general, and in particular for identifying clashes. For instance, many construction professionals prefer to view clashes in a 2D representation, especially when on site, due to the simplicity and clarity with which information is displayed in a 2D view as compared to a 3D view, which requires more effort from a construction professional in order to focus on a particular element from a particular perspective.

Thus, in many instances, it can be beneficial to utilize two-dimensional representations (e.g., 2D computerized drawings) of a construction project to identify clashes between objects of the construction project.

However, the construction industry in general has suffered from limitations in software technology and tools for generating, from a 3D model of a construction project, two-dimensional views that are usable for purposes of clash detection. For instance, generating a 2D view from a 3D model of a construction project generally involves setting the location of a cross-sectioning plane within the 3D model and then tracing all of the 3D meshes that intersect the cross-sectioning plane. In practice, the process of tracing 3D meshes that intersect a cross-sectioning plane typically yields short, disconnected, overlapping line segments (i.e., line segments from the triangles that formed the mesh's surface) that have lost any kind of meaningful association with the physical object that the mesh represents. As a result, although the tracing process may yield a 2D view that is useful for visualization purposes, it is difficult for a computing system to perform any type of substantive analysis on those line segments, such as associating the line segments with a defined object, determining whether one object appearing in the 2D view intersects another, etc. As a result, clash detection is often performed today by generating selected 2D views from a 3D model and then visually (i.e., manually) inspecting the 2D views to search for any apparent clashes between objects. Performing 2D clash detection in this manner can be a tedious and error-prone process that can lead to inaccuracies, such as failure to identify clashes that require resolution.

To address these and other shortcomings, Procore Technologies has developed new software technology that includes new techniques for generating a two-dimensional view from a three-dimensional model of a construction project and then enabling clash detection on objects within the generated two-dimensional view.

In one aspect, the disclosed software technology involves (1) tracing an intersection of (i) a cross-section plane with (ii) two or more objects in a three-dimensional model of a construction project, (2) based on tracing the intersection, determining respective two-dimensional boundaries of the two or more objects, and (3) generating a two-dimensional cross-sectional view that depicts the intersection and includes respective, discrete representations of the two or more objects.

In another aspect, the disclosed software technology involves (1) enabling a user to provide user input indicating two or more object classes based on which clash detection is to be performed for objects within a generated two-dimensional view, (2) based on the user input, identifying any clashes between the objects displayed in the generated two-dimensional view, and (3) causing respective indications of each identified clash to be presented to the user.

In some implementations, the disclosed software technology further enables a user to take one or more actions with respect to an identified clash. Further yet, in some implementations, the disclosed software technology provides a recommended solution for resolving an identified clash.

Accordingly, disclosed herein is a method for facilitating automated two-dimensional (2D) clash detection that involves:

Further, disclosed herein is a computing platform that includes a network interface, at least one processor, a non-transitory computer-readable medium, and program instructions stored on the non-transitory computer-readable medium that are executable by the at least one processor to cause the computing platform to carry out one or more of the functions disclosed herein, including but not limited to the functions of the foregoing method.

Further yet, disclosed herein is a non-transitory computer-readable storage medium that is provisioned with program instructions that, when executed by at least one processor, cause a computing platform to carry out one or more of the functions disclosed herein, including but not limited to the functions of the foregoing method.

As will be described in detail further below, the disclosed software technology includes various aspects, which may be implemented either individually or in combination. For instance, the disclosed software technology may include one or more software systems or subsystems that may run independently of each other and at different times, or may run in conjunction with one another, such as in instances where an output of one software system or subsystem forms part of an input for another software system or subsystem. Other examples are also possible.

One of ordinary skill in the art will appreciate these as well as numerous other aspects in reading the following disclosure.

Figure 1:
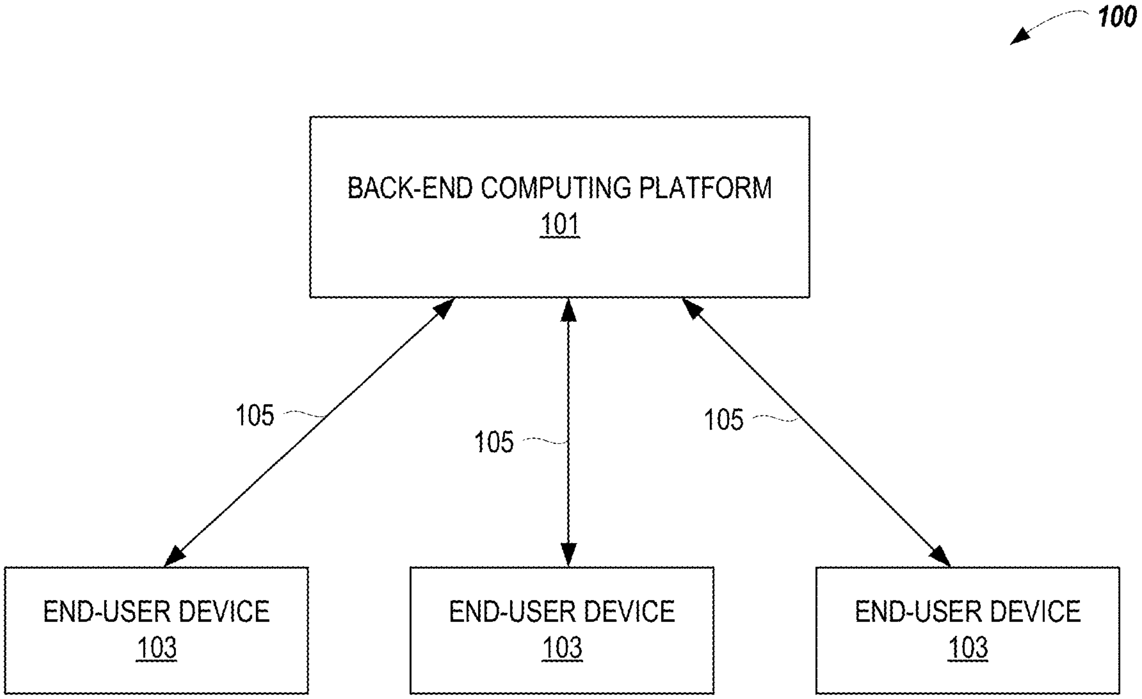
FIG. 1 depicts an example network configuration in which example embodiments may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

The present disclosure is generally directed to new software technology that enables automated clash detection on objects in a two-dimensional view. At a high level, the disclosed software technology may function to (1) trace an intersection of (i) a cross-section plane with (ii) two or more objects in a three-dimensional model of a construction project, (2) based on tracing the intersection, determine respective two-dimensional boundaries of the two or more objects, and (3) generate a two-dimensional cross-sectional view that depicts the intersection and includes respective, discrete representations of the two or more objects. The disclosed software technology may further function to (1) enable a user to provide user input indicating two or more object classes based on which clash detection is to be performed for objects within a generated two-dimensional view, (2) based on the user input, identify any clashes between the objects displayed in the generated two-dimensional view, and (3) cause respective indications of each identified clash to be presented to the user. In some implementations, the disclosed software technology may function to facilitate user action with respect to an identified clash. Further, in some implementations, the disclosed software technology may function to determine and/or display possible resolutions for identified clashes.

The disclosed software technology may be incorporated into one or more software applications that may take any of various forms.

As one possible implementation, this software technology may be incorporated into a software as a service ("SaaS") application that includes both front-end software running on one or more end-user devices that are accessible to individuals associated with construction projects (e.g., contractors, subcontractors, project managers, architects, engineers, designers, etc., each of which may be referred to generally herein as a "construction professional") and back-end software running on a back-end computing platform (sometimes referred to as a "cloud" platform) that interacts with and/or drives the front-end software, and which may be operated (either directly or indirectly) by the provider of the front-end software. As another possible implementation, this software technology may be incorporated into a software application that takes the form of front-end client software running on one or more end-user devices without interaction with a back-end computing platform. The software technology disclosed herein may be incorporated into a software application that takes other forms as well. Further, such front-end client software may take various forms, examples of which may include a native application (e.g., a mobile application), a web application running on an end-user device, and/or a hybrid application, among other possibilities.

Turning now to the figures, FIG. 1 depicts an example network configuration 100 in which example embodiments of the present disclosure may be implemented. As shown in FIG. 1, network configuration 100 includes a back-end computing platform 101 that may be communicatively coupled to one or more end-user devices, depicted here, for the sake of discussion, as end-user devices 103.

Broadly speaking, the back-end computing platform 101 may comprise one or more computing systems that have been provisioned with software for carrying out one or more of the functions disclosed herein, including but not limited to functions related to receiving and evaluating project data, causing information to be displayed via a front-end interface (e.g., a graphical user interface (GUI)) through which the data is presented on the one or more end-user devices, and determining information for presentation to a user. The one or more computing systems of the back-end computing platform 101 may take various forms and be arranged in various manners.

For instance, as one possibility, the back-end computing platform 101 may comprise computing infrastructure of a public, private, and/or hybrid cloud (e.g., computing and/or storage clusters) that has been provisioned with software for carrying out one or more of the functions disclosed herein. In this respect, the entity that owns and operates back-end computing platform 101 may either supply its own cloud infrastructure or may obtain the cloud infrastructure from a third-party provider of "on demand" computing resources, such as Amazon Web Services (AWS) or the like. As another possibility, the back-end computing platform 101 may comprise one or more dedicated servers that have been provisioned with software for carrying out one or more of the functions disclosed herein. Other implementations of the back-end computing platform 101 are possible as well.

In turn, end-user devices 103 may each be any computing device that is capable of running the front-end software disclosed herein. In this respect, the end-user devices 103 may each include hardware components such as a processor, data storage, a communication interface, and user-interface components (or interfaces for connecting thereto), among other possible hardware components, as well as software components that facilitate the end-user device's ability to run the front-end software incorporating the features disclosed herein (e.g., operating system software, web browser software, mobile applications, etc.). As representative examples, end-user devices 103 may each take the form of a desktop computer, a laptop, a netbook, a tablet, a smartphone, and/or a personal digital assistant (PDA), among other possibilities.

As further depicted in FIG. 1, the back-end computing platform 101 may be configured to interact with the end-user devices 103 over respective communication paths 105. In this respect, each respective communication path 105 between the back-end computing platform 101 and an end-user device 103 may generally comprise one or more communication networks and/or communications links, which may take any of various forms. For instance, each respective communication path 105 with the back-end computing platform 101 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path 105 with the back-end computing platform 101 may be wireless, wired, or some combination thereof, and may carry data according to any of various different communication protocols. Although not shown, the respective communication paths 105 between the end-user devices 103 and the back-end computing platform 101 may also include one or more intermediate systems. For example, it is possible that the back-end computing platform 101 may communicate with a given end-user device 103 via one or more intermediary systems, such as a host server (not shown). Many other configurations are also possible.

While FIG. 1 shows an arrangement in which three particular end-user devices are communicatively coupled to the back-end computing platform 101, it should be understood that this is merely for purposes of illustration and that any number of end-user devices may communicate with the back-end computing platform 101.

Although not shown in FIG. 1, the back-end computing platform 101 may also be configured to receive data, such as data related to a construction project, from one or more external data sources, such as an external database and/or another back-end computing platform or platforms. Such data sources—and the data output by such data sources—may take various forms.

It should be understood that the network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE BACK-END COMPUTING PLATFORM

Figure 2:
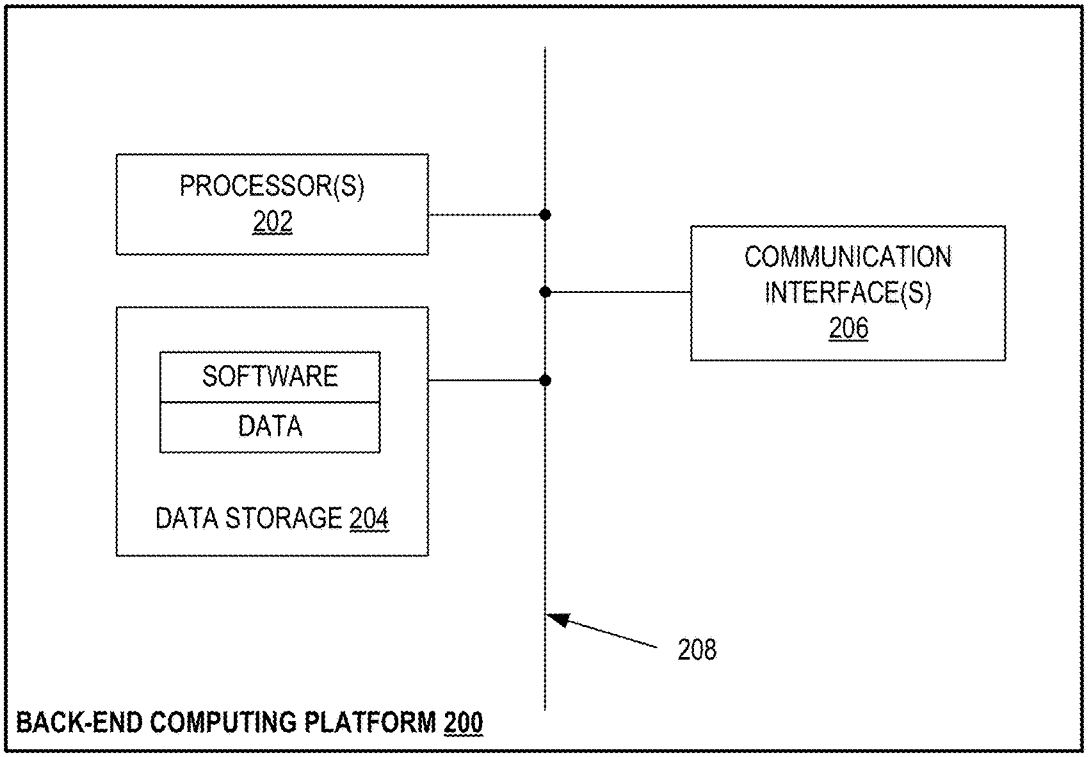
FIG. 2 depicts a structural diagram of an example computing platform that may be configured to carry out one or more of the functions according to the disclosed software technology.

FIG. 2 is a simplified block diagram illustrating some structural components that may be included in an example back-end computing platform 200, which could serve as, for instance, the back-end computing platform 101 of FIG. 1. In line with the discussion above, the back-end computing platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums that are collectively configured to store (i) program instructions that are executable by processor 202 such that the back-end computing platform 200 is configured to perform some or all of the functions disclosed herein, which may be arranged together into software applications, virtual machines, software development kits, toolsets, or the like, and (ii) data that may be received, derived, or otherwise stored, for example, in one or more databases, file systems, or the like, by the back-end computing platform 200 in connection with the disclosed functions. In this respect, the one or more non-transitory computer-readable storage mediums of data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud. Data storage 204 may take other forms and/or store data in other manners as well.

Communication interface 206 may be configured to facilitate wireless and/or wired communication with external data sources and/or end-user devices, such as one or more end-user devices 103 of FIG. 1. Additionally, in an implementation where the back-end computing platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may facilitate communications according to any of various communications protocols, examples of which may include Ethernet, Wi-Fi, cellular network, serial bus (e.g., Firewire, USB 3.0, etc.), short-range wireless protocols, and/or any other communication protocol that provides for wireless and/or wired communication. Communication interface 206 may also include multiple communication interfaces of different types. Other configurations are possible as well.

Although not shown, the back-end computing platform 200 may additionally include or have one or more interfaces for connecting to user-interface components that facilitate user interaction with the back-end computing platform 200, such as a keyboard, a mouse, a trackpad, a display screen, a touch-sensitive interface, a stylus, a virtual-reality headset, and/or speakers, among other possibilities, which may allow for direct user interaction with the back-end computing platform 200. Further, although not shown, an end-user device, such as one or more of the end-user devices 103, may include similar components to the back-end computing platform 200, such as a processor, a data storage, and a communication interface. Further, the end-user device may also include or be connected to a device, such as a smartphone, a laptop, a tablet, or a desktop, among other possibilities, that includes integrated user interface equipment, such as a keyboard, a mouse, a trackpad, a display screen, a touch-sensitive interface, a stylus, a virtual-reality headset, speakers, etc., which may allow for direct user interaction with the back-end computing platform 200.

It should be understood that the back-end computing platform 200 is one example of a computing platform that may be used with the embodiments described herein. Numerous other arrangements are possible and contemplated herein. For instance, other computing platforms may include additional components not pictured and/or more or fewer of the pictured components.

III. EXAMPLE END-USER DEVICE

Figure 3:
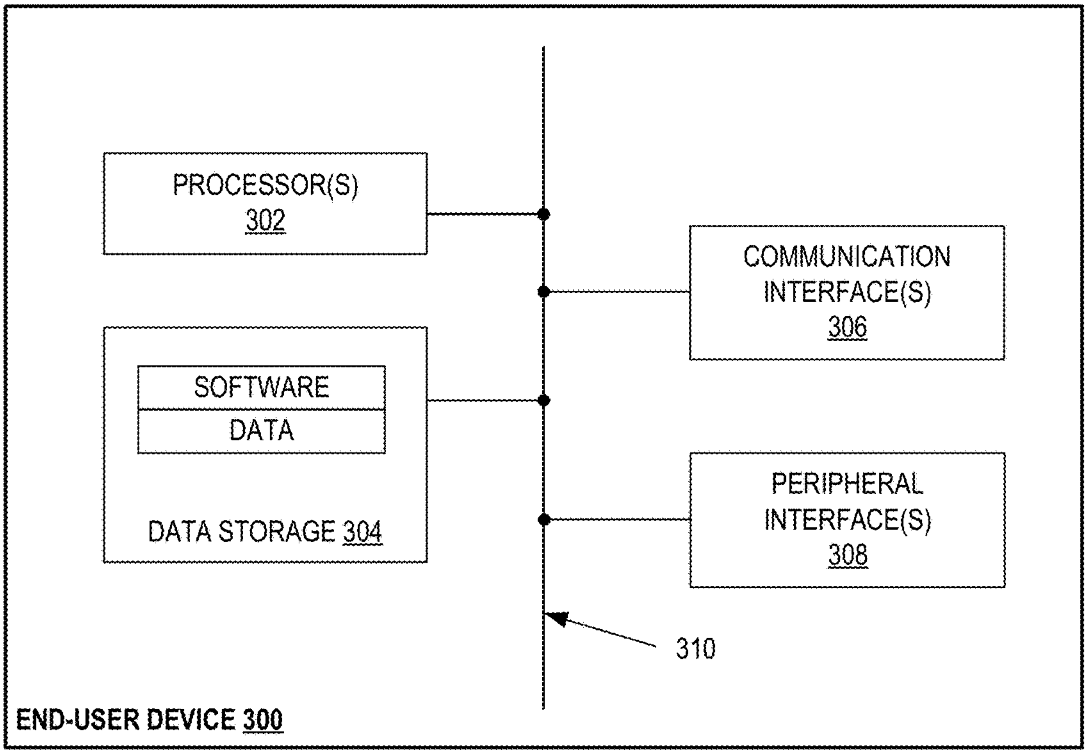
FIG. 3 depicts a structural diagram of an example end-user device that may be configured to communicate with the example computing platform of FIG. 2 and also carry out one or more functions in accordance with aspects of the disclosed technology.

Turning now to FIG. 3, a simplified block diagram is provided to illustrate some structural components that may be included in an example end-user device 300, which may serve as an end-user device 103 described above with reference to FIG. 1. As shown in FIG. 3, the end-user device 300 may include one or more processors 302, data storage 304, one or more communication interfaces 306, and one or more peripheral interfaces 308, all of which may be communicatively linked by a communication link 310 that may take the form of a system bus or some other connection mechanism. Each of these components may take various forms.

The one or more processors 302 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

The data storage 304 may comprise one or more non-transitory computer-readable storage mediums that are collectively configured to store (i) program instructions that are executable by the processor(s) 302 such that the end-user device 300 is configured to perform certain functions related to interacting with and accessing services provided by a computing platform, such as the example back-end computing platform 200 described above with reference to FIG. 2, and (ii) data that may be received, derived, or otherwise stored, for example, in one or more databases, file systems, repositories, or the like, by the end-user device 300, related to interacting with and accessing the services provided by the computing platform. In this respect, the one or more non-transitory computer-readable storage mediums of the data storage 304 may take various forms, examples of which may include volatile storage mediums such as random-access memory, registers, cache, etc., and non-volatile storage mediums such as read-only memory, a hard-disk drive, a solid-state drive, flash memory, an optical-storage device etc. The data storage 304 may take other forms and/or store data in other manners as well.

The one or more communication interfaces 306 may be configured to facilitate wireless and/or wired communication with other computing devices. The one or more communication interfaces 306 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 300 may additionally include or have one or more peripheral interfaces for connecting to an electronic peripheral that facilitates user interaction with the end-user device 300, such as a keyboard, a mouse, a trackpad, a display screen, a touch-sensitive interface, a stylus, a virtual-reality headset, and/or one or more speaker components, among other possibilities.

It should be understood that the end-user device 300 is one example of an end-user device that may be used to interact with a computing platform as described herein and/or perform one or more of the functions described herein. Numerous other arrangements are possible and contemplated herein. For instance, in other embodiments, the end-user device 300 may include additional components not pictured and/or more or fewer of the pictured components.

IV. EXAMPLE TWO-DIMENSIONAL VIEWS

As mentioned above, limitations in software technology and tools for generating two-dimensional views that are usable for purposes of clash detection have impeded the ability to implement automated 2D clash detection, largely due to shortcomings in the process of tracing a 3D mesh that intersects a cross-sectioning plane of a 3D model of a construction project in a manner that provides meaningful information about the physical object that the mesh represents. To illustrate, consider the example shown in FIG. 4.

Figure 4:
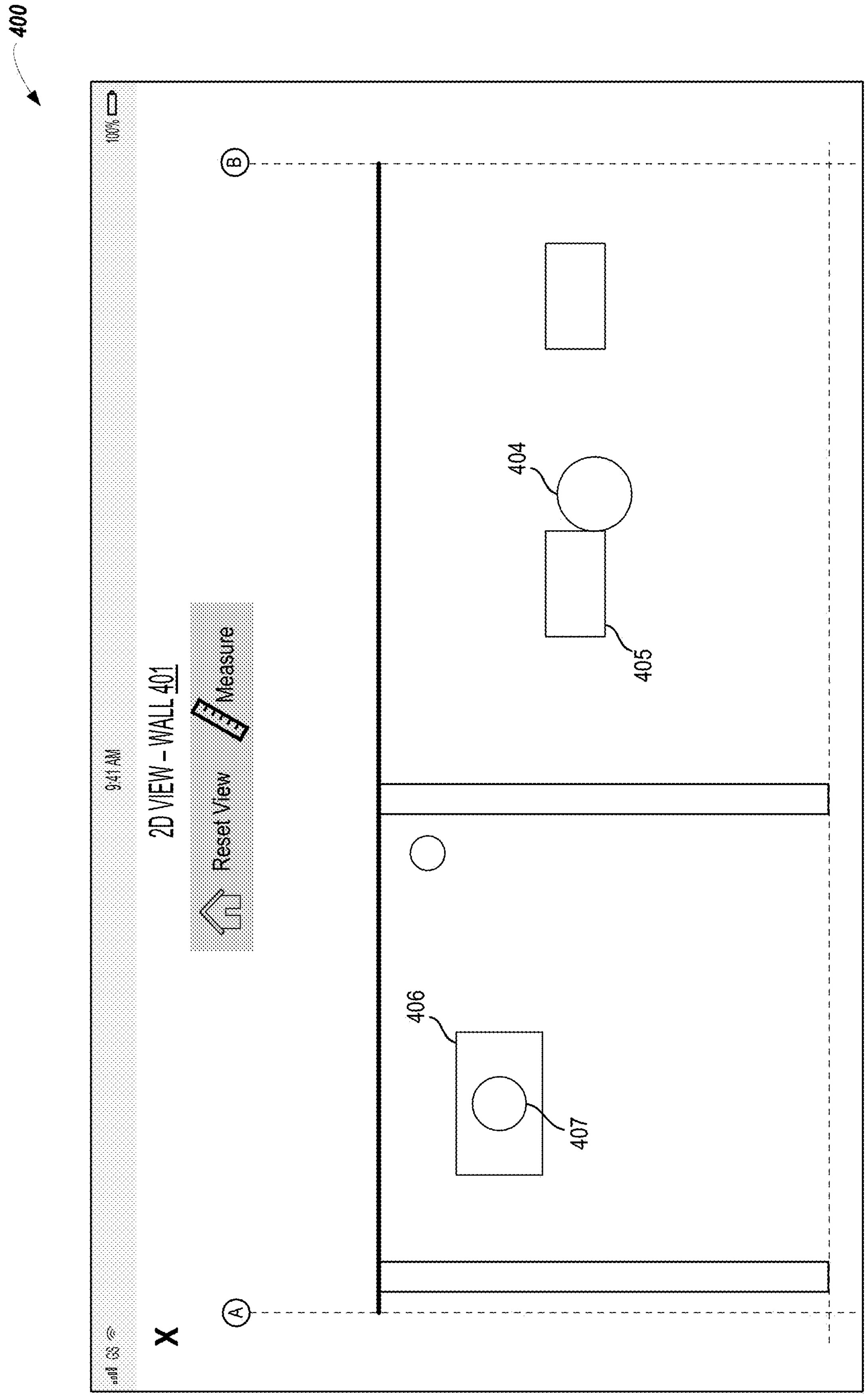
FIG. 4 depicts an example two-dimensional cross-sectional view of a three-dimensional drawing file.

FIG. 4 depicts an example of a cross-sectional view 400 of a three-dimensional drawing file. For instance, the cross-sectional view 400 may represent a cross-section of the three-dimensional drawing file along a cross-sectional plane that includes the face of a wall 401. Several objects that intersect the wall 401 are depicted as two-dimensional shapes, such as rectangular shapes 405 and 406 that may represent, for example, HVAC registers, and circular shapes 404 and 407 that may represent, for example, pipes. As shown in FIG. 4, the view 400 also includes other two-dimensional shapes that represent other objects intersecting the wall 401.

In line with the discussion above, a construction professional may wish to use the cross-sectional view 400 to identify clashes between objects displayed within the view 400. However, as noted above, current software tools for generating cross-sectional views from three-dimensional drawing files as shown in FIG. 4 do not provide for automated clash detection in 2D views because when generated and displayed in the cross-sectional view 400, the objects intersecting the wall 401 are not treated as discrete, bounded objects that can be analyzed for the purposes of clash detection. Rather, each object is formed (e.g., during a tracing operation) from a collection of discontinuous line segments.

Further, because of the way the objects intersecting the wall 401 are defined during generation of the cross-sectional view 400, it may not be a straightforward process to generate, for each object, a discrete boundary representing the object in the 2D view. For instance, the boundary of each object may be defined by a plurality of line segments that collectively represent the portions of the mesh (e.g., portions of individual geometric triangles) that were traced from the three-dimensional drawing file to create the cross-sectional view 400. In this regard, the plurality of line segments may include numerous two-dimensional vectors that have various different lengths, overlap with each other to various degrees, and are arranged in different orientations. Thus, determining a single closed path among these numerous line segments to generate a discrete boundary that defines each object can be a challenging task. As a result, an analysis to detect clashes based on the intersection between boundaries of respective objects cannot be performed, because a discrete boundary for each object does not exist.

Figure 5:
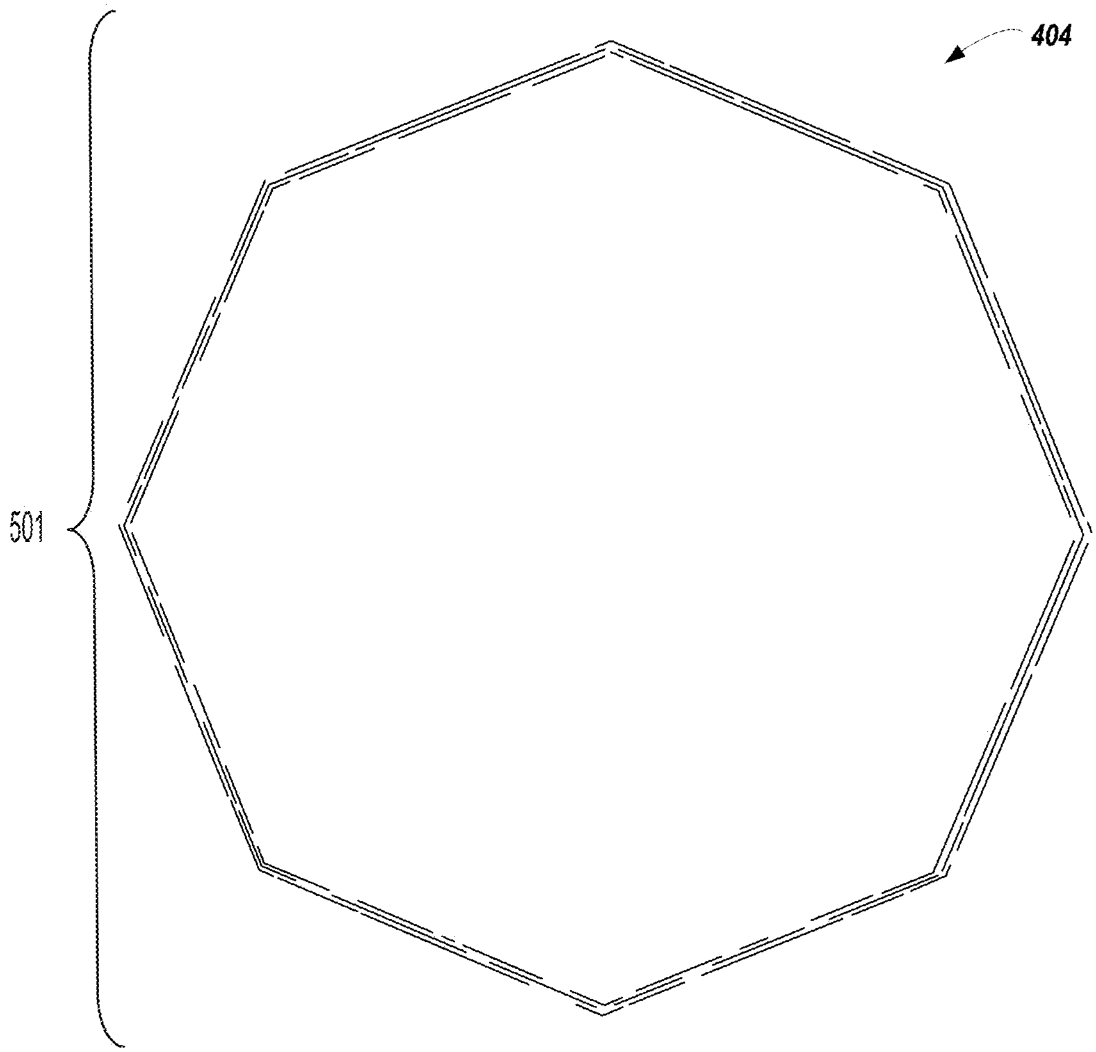
FIG. 5 depicts a schematic diagram of a plurality of line segments defining an object in the two-dimensional cross-sectional view shown in FIG. 4.

To illustrate with an example, FIG. 5 depicts a close-up, schematic diagram of the object 404 shown in FIG. 4. As shown in FIG. 5, a plurality of line segments 501 collectively define a boundary of the object 404. In this regard, it should be understood that although the plurality of line segments 501 are shown in FIG. 5 as slightly offset from one another, this is for purposes of illustration only, to provide a sense of the fragmented, layered, and disconnected arrangement of the line segments that are defined during generation of the 2D object 404. In practice, the plurality of line segments 501 shown in FIG. 5 would be stacked on top of each other, overlapping to collectively define what appears to be a continuous two-dimensional boundary for the object 404 shown in the cross-sectional view 400. Further, in practice, a given object may include significantly more overlapping line segments than the schematic example shown in FIG. 5. Additionally, although the line segments 501 are shown in FIG. 5 to form a generally octagonal shape, it should be understood that this is also for the purposes of illustration only. In practice, the line segments traced from a given 3D mesh for a curved object, such as the object 404, would be extremely short and densely packed to form a shape that matches that of the given physical object that the 3D mesh represents.

For these reasons, there exists no mechanism for performing automated 2D clash detection on objects within a 2D view that was generated from a 3D model, such as the view 400 shown in FIG. 4. Thus, in practice, a construction professional would need to visually (i.e., manually) review each object displayed within the view 400 to evaluate whether any objects clash with one another. As explained above, this process can be tedious and error-prone. For example, during manual evaluation of the objects in the view 400, the construction professional may fail to identify a clash between the objects 404 and 405 because it may appear to the construction professional that while those objects are in close proximity, they do not overlap. However, it may be the case that the outer edges of the objects 404 and 405 do, in fact, intersect and that one or both of the objects would need to be repositioned during construction/installation. As another example, during manual evaluation of the objects in the view 400, the construction professional may fail to identify a clash between the objects 406 and 407 because it may appear to the construction professional that the object 406 is a hollow space, and the object 407 does not intersect with the object 406. However, it may be the case that the objects 406 and 407 each represents a solid physical object, such as an HVAC register and a speaker, respectively, that cannot practically be installed in the same space and that one or both of the objects would need to be repositioned during construction/installation. As yet another possibility, a generated 2D view might present substantially more information than the simplified example shown in FIG. 4, including objects of varying size. Accordingly, some clashes present within the 2D view may simply be overlooked entirely.

Failure to detect such clashes could have detrimental impacts on the progress of a construction project. For instance, if the clash between the HVAC register 406 and the speaker 407 was not detected during the planning/design phase(s), the clash may not be discovered until after construction commences, at which point adjusting the installation location for one or both of the speaker 407 or the HVAC register 406 may prove difficult and/or costly. For example, at the time the conflict is discovered, it may be determined that the HVAC register 406 cannot be repositioned without considerable effort and cost because a corresponding HVAC vent to which the register is to be connected has already been installed. Thus, it may be determined that the best solution for resolving the clash would be to reposition the installation location of the speaker 407. However, repositioning the speaker 407 may also prove challenging. For instance, it may further be determined that the wall 401 has already been painted, that there is no appropriate penetration in the wall 401 for receiving the speaker 407, and/or that there is no available electrical hookup for installing/connecting the speaker 407 in the designation location. In such an instance, plans for the construction project would need to be revised to either discard installation of the speaker 407, which may impact client satisfaction, contractor liability, utility of the facility being constructed, etc., or to enable installation of the speaker 407—perhaps at a new location within the wall 401—which may involve creating new project tasks, such as a first new task to create a new opening within the wall 401 for receiving the speaker 407, a second new task to add equipment to enable functionality of the speaker 407 (e.g., wiring/cabling for connecting the speaker 407 to a power source and/or an audio system, etc.), and a third new task to repaint the wall 401, and then scheduling construction crews to perform those new tasks. Other aspects of the construction project may be impacted as well. For instance, failure to detect the clash between the speaker 407 and the HVAC register 406 before commencing construction may result in additional time and costs incurred, which may in turn cause scheduling delays and/or budget overages for the construction project.

V. EXAMPLE FUNCTIONALITY

To help address some of the aforementioned limitations, disclosed herein is new software technology for facilitating two-dimensional clash detection that involves generating, from a three-dimensional drawing file, a two-dimensional view that involves (i) tracing an intersection of a cross-sectional plane and two or more objects, (ii) based on the tracing, determining a discrete respective two-dimensional boundary for each object in the two-dimensional view, and (iii) based on the determined two-dimensional boundaries, performing automated two-dimensional clash detection for the objects in the two-dimensional view.

Figure 6:
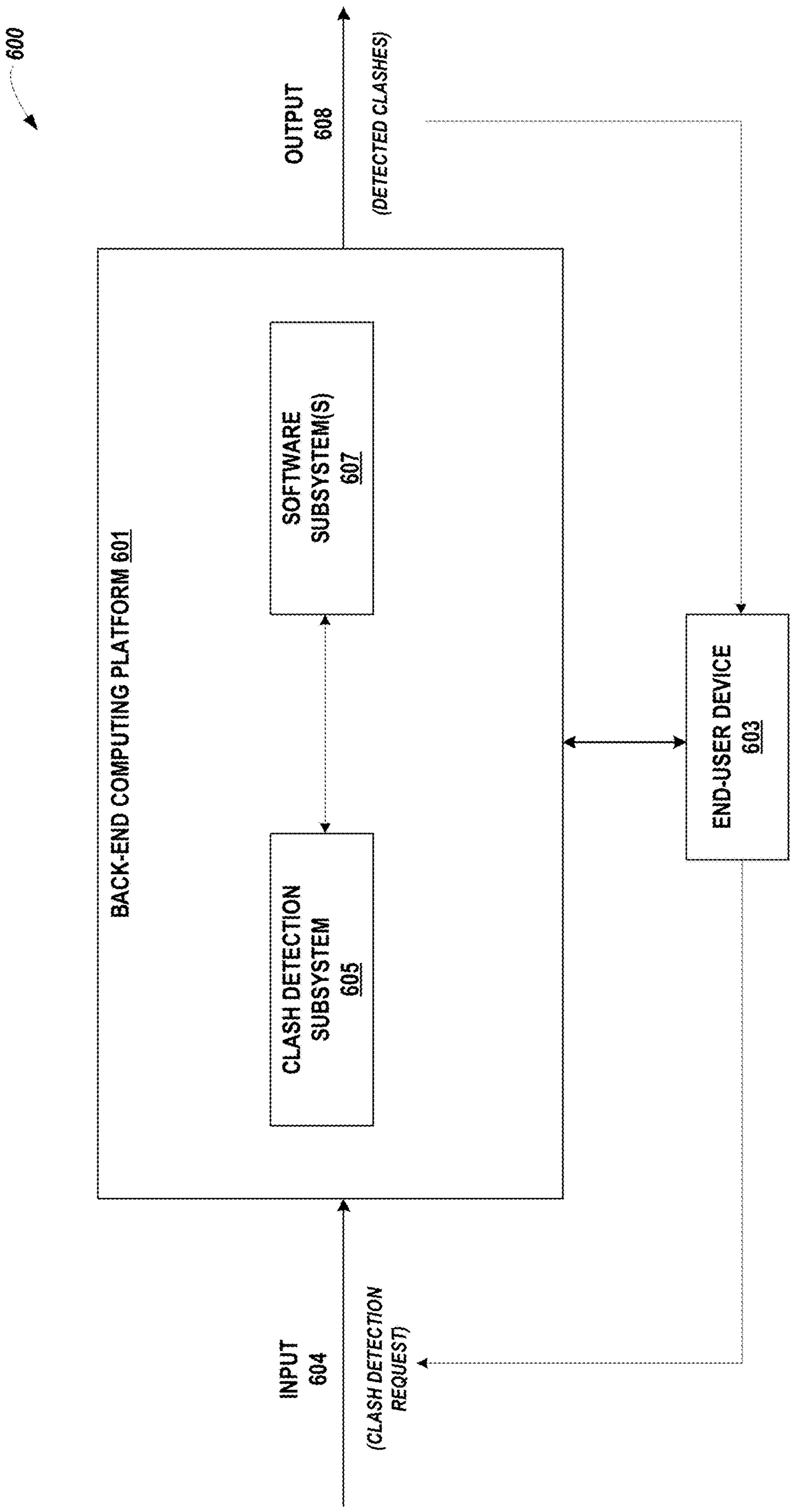
FIG. 6 depicts an example structural diagram of a computing environment in which aspects of the disclosed technology may be implemented.

Turning now to FIG. 6, an example computing environment 600 in which aspects of the disclosed technology may be implemented is depicted. The computing environment 600 may include a back-end computing platform 601 that is configured to run the software technology disclosed herein. For instance, the disclosed software technology for two-dimensional clash detection may be incorporated in a software application (e.g., mobile application, web application, etc.) that is run by the back-end computing platform 601. In some implementations, the back-end computing platform 601 may resemble or be the same as the back-end computing platform 101 shown in FIG. 1.

The back-end computing platform 601 may comprise various software subsystems that are responsible for carrying out certain functions, including one or more of the functions disclosed herein. Such software subsystems may take various forms. For instance, as shown in FIG. 6, the back-end computing platform 601 comprises a "clash detection" subsystem 605. The back-end computing platform 601 further comprises one or more other software subsystems 607, which may take various forms. For instance, the software subsystem(s) 607 may include a 2D cross-sectioning software subsystem that is configured to generate 2D views from 3D models of construction projects, a 3D software subsystem that is configured to generate 3D models of construction projects, and a project data software subsystem that is configured to ingest and process data for construction projects, among many other examples. Further, although not shown in FIG. 6, the back-end computing platform 601 may comprise one or more data stores that are configured to store data for construction projects.

At a high level, the clash detection subsystem 605 may generally function to (i) receive, as an input 604, a request to identify clashes within a 2D view generated from a 3D model of a construction project, (ii) identify any clashes within the 2D view based on the request, and (iii) provide, as an output 608, information about each identified clash between objects within the 2D view. The clash detection subsystem 605 may interact with one or more software subsystems of the back-end computing platform to carry out the one or more functions disclosed herein. For instance, the clash detection subsystem 605 may interact with software subsystem(s) 607 to obtain a 2D view of a 3D model of a given construction project, access project data (e.g., a list of object classes) associated with a given construction project, among other possibilities. The clash detection subsystem 605 may interact with other software subsystems as well.

The computing environment 600 may further comprise at least one end-user device 603 that is configured to communicate with the back-end computing platform 601. In some implementations, the end-user device 603 may resemble or be the same as one of the end-user devices 103 shown in FIG. 1 or the end-user device 300 shown in FIG. 3.

The end-user device 603 may be configured to receive user input indicating a clash detection request and provide an indication of the clash detection request to the back-end computing platform 601. The indication of the clash detection request may serve as an input 604 to the clash detection subsystem 605, which may generally function to identify clashes within a 2D view of a construction project. In turn, the back-end computing platform 601 may cause the end-user device 603 to present one or more interface views that enable a user to define a scope for detecting clashes within the 2D view. After receiving an indication of the scope, the back-end computing platform 601 may identify one or more clashes within the 2D view, which may form the output 608. The output 608 may be provided at least to the end-user device 603, which may present a respective visual representation of each identified clash.

The visual representation of each identified clash may be selectable for further information and/or action. For instance, the end-user device 603 may receive user input indicating selection of a given clash that was identified by the back-end computing platform 601 and presented at the end-user device 603 and may then provide an indication of the given clash to the back-end computing platform 601, based on which the back-end computing platform may cause the end-user device 603 to display one or more interface views enabling a user to view information about the given clash and/or perform one or more actions for the given clash (e.g., resolve the clash, tag the clash for review, share the clash with another user, save the clash, etc.).

The various functionalities that may be carried out for two-dimensional clash detection as disclosed herein will be described in more detail below with respect to FIGS. 7-10. For purposes of discussion, the examples below may describe the disclosed functionality as being carried out in the context of the computing environment 600 discussed above with reference to FIG. 6 (e.g., by one or more of the computing devices shown in FIG. 6, such as the back-end computing platform 601 or the end-user device 603), but it should be understood that any of the functionality disclosed herein may be carried out by or shared between any back-end computing platform that is configured to run the disclosed technology and/or any end-user device that is configured to communicate with the back-end computing platform.

The input 604 that is received by the clash detection subsystem 605 may take various forms.

In one implementation, the input 604 may comprise a clash detection request that comprises a request to identify clashes within a 2D view being displayed at an end-user device based on a user-defined scope. For example, as one possibility, a user (e.g., a construction professional) may use the end-user device 603 to interact with a user interface of a construction management software application (e.g., hosted by the back-end computing platform 601), navigate to a software tool for generating 2D views, and select an option to generate a 2D view from a 3D file of a construction project, wherein the generated 2D view comprises a cross-sectional view of an intersection between a cross-sectional plane and two or more objects. The user may then select a software tool to initiate 2D clash detection on objects within the generated 2D view. In another implementation, the input 604 may comprise a clash detection request that comprises a request to generate a 2D view from a 3D model based on a user-defined scope. For instance, the user may interact with a 3D model of a construction project that is being displayed via a user interface of the end-user device 603. The user may wish to identify clashes between objects within a certain section of the 3D model. Accordingly, the user may provide one or more user inputs that comprise (i) a defined cross-sectional plane within the 3D model that intersects two or more objects within the 3D model and (ii) a request to generate a two-dimensional cross-sectional view based on the intersection of the defined cross-sectional plane and the two or more objects within the 3D model. The input 604 may take other forms as well.

In any case, the one or more user interface views for inputting the new clash detection request may enable the construction professional to provide one or more user inputs that collectively indicate a scope based on which clashes between objects within a generated 2D view should be identified.

The scope of the clash detection request may take various forms. As one example, the scope may indicate two or more types of objects for which clashes should be identified. For instance, the construction professional may provide user input indicating a request to detect clashes between pipes and ducts. As another example, the scope may indicate two or more types of object classes for which clashes should be identified. For instance, the construction professional may provide user input indicating a request to detect clashes between structural objects and electrical objects.

As yet another example, the scope may indicate two or more sets of object types or object classes for which clashes should be identified. For instance, in one implementation, the one or more user interface views for inputting the new clash detection request may enable the construction professional to select two or more sets of objects or object types that meet certain criteria. For example, the construction professional may wish to detect clashes involving only certain types of objects within a particular object class, such as structural objects that comprise structural framing objects. In such an instance, the construction professional may define a new search set (or select a predefined search set) based on which clashes are to be identified. Such search sets may be defined in various ways.

Figure 7:
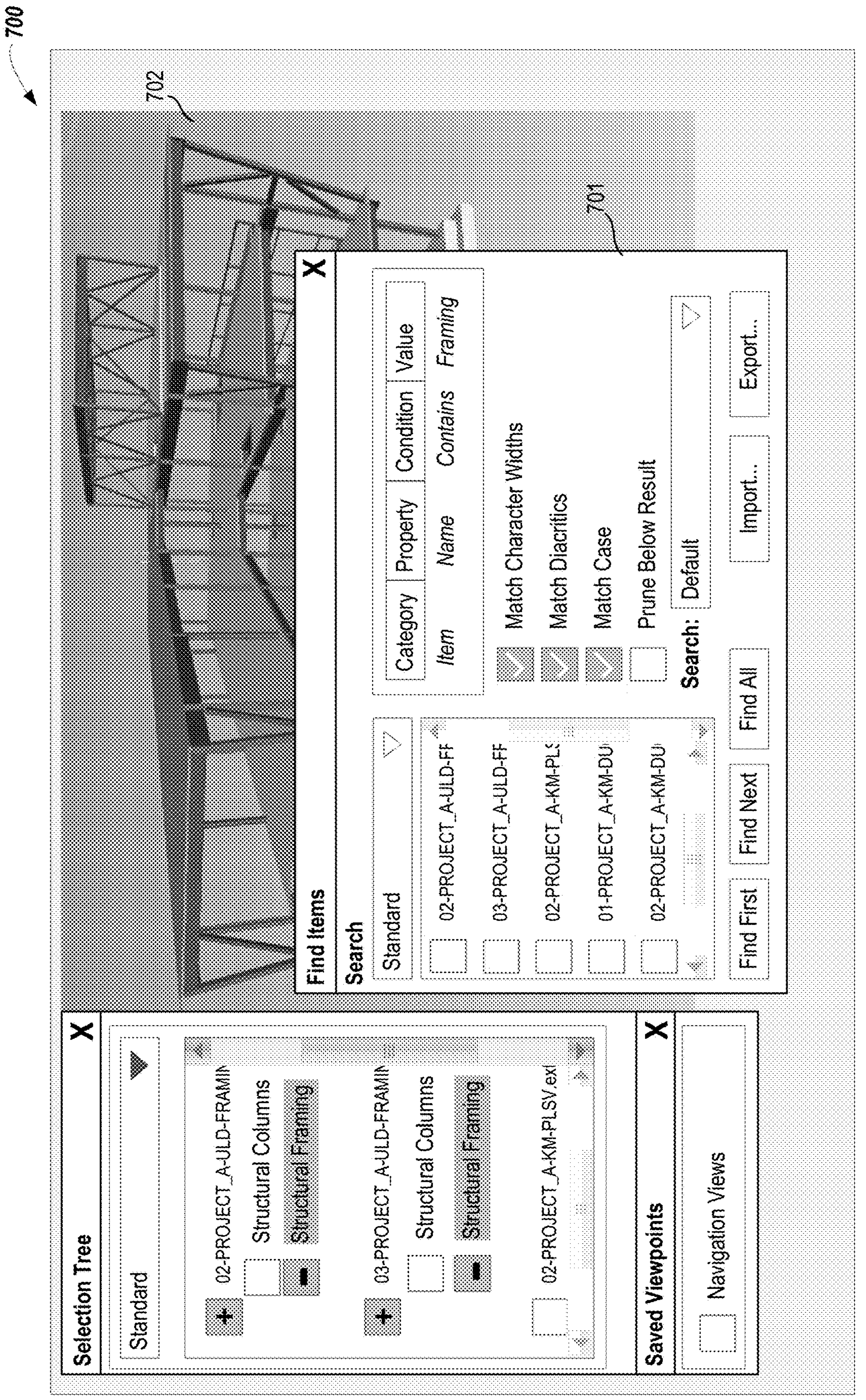
FIG. 7 depicts an example interface view that enables providing user input defining a scope for a two-dimensional clash detection request in accordance with aspects of the disclosed technology.

For example, as one possibility, a search set may be defined via a series of user inputs provided via a user interface. FIG. 7 depicts an example user interface view 700 that may be displayed to a user for defining a new search set. The view 700 may comprise a selection pane 701 and a viewing pane 702. As shown in FIG. 7, the selection pane 701 may include various selectable options whereby the construction professional can define one or more rules based on which objects are to be included in the new search set. Each rule may generally indicate one or more conditions that objects must meet (e.g., attributes that objects must have) in order to be included in the new search set. In the example of FIG. 7, the construction professional has selected various options using the selection pane 701 to define a rule for a search set that is to include objects having a "Name" field with the value "Framing." Based on such a rule, the back-end computing platform 601 may identify objects that have a "Name" field with the value "Framing" and perform clash detection on those identified objects.

As further shown in FIG. 7, the viewing pane 702 depicts a portion of a 3D model of the given construction project. The viewing pane 702 may be dynamically updated based on inputs provided at the selection pane 701 to reflect objects within the portion of the 3D model that fall within the search set defined by the inputs provided at the selection pane 701. For instance, as shown in FIG. 7, the viewing pane 702 reflects objects that fall within the search set defined by the rule defined via the selection pane 701. For example, the viewing pane 702 indicates structural framing objects that are present in the portion of the 3D model depicted in the viewing pane. In the example of FIG. 7, the viewing pane 702 indicates the structural framing objects by depicting those objects in a particular color (e.g., blue). However, it should be understood that search set objects may be indicated in other ways as well.

As another possibility, a search set may be defined based on selecting a given search set from a set of one or more predefined search sets. As yet another possibility, a search set may be defined based on obtaining a predefined search set from an external source. For instance, the one or more user interface views may enable the construction professional to import or upload a predefined search set (or a search set template). Other examples are also possible.

In line with the discussion above, the construction professional may define the scope of the clash detection request to identify two or more criteria (e.g., two or more object types, two or more object classes, two or more search sets, or any combination thereof) based on which the clash detection analysis is to be performed.

After a scope for the clash detection request has been provided as described above via one or more interface views displayed at the end-user device 603, the end-user device 603 may provide data defining the scope to the back-end computing platform 601, which may be included as part of the input 604 received by the clash detection subsystem 605. In turn, the back-end computing platform 601 may identify objects within the 2D view that fall within the defined scope.

To identify the objects within the 2D view that fall within the scope of the clash detection request, the back-end computing platform 601 may analyze the characteristics of each object in the 2D view (e.g., evaluate metadata associated with each object indicating an object type, object class, etc.) to determine which objects meet the criteria defined by the scope of the clash detection request. In order to perform such an analysis, the back-end computing platform 601 may first identify each discrete object within the 2D view, which may comprise defining a discrete two-dimensional boundary for each object within the 2D view. The process of defining a discrete two-dimensional boundary for each object within the 2D view may take various forms.

For instance, as one possibility, defining a discrete two-dimensional boundary for each object within the 2D view may begin with tracing the intersection of the cross-section plane and the two or more objects in the 3D model based on which the cross-sectional 2D view is generated. Such a tracing process may involve, for each object in the 3D model intersecting the cross-sectional plane, (i) determining a plurality of two-dimensional line segments that collectively define a boundary of the object, where each line segment comprises a vector that has an associated direction and includes a starting point and an ending point, (ii) for each line segment, determining one or more nearby line segments based on a distance between an end point of the line segment and an end point of the one or more nearby line segments being within a threshold distance, (iii) determining one or more fully-connected object boundaries by progressively connecting respective sets of nearby line segments in series, (iv) determining, from the one or more fully-connected object boundaries, a final object boundary that will be used as a discrete two-dimensional boundary for the object in the 2D view, and (v) add the final object boundary to the 2D view as the discrete two-dimensional boundary of the object.

The back-end computing platform 601 may determine the final object boundary in various ways. For instance, the computing device may be configured to discard any incomplete object boundaries, as well as any fully-connected object boundaries that have a total area that is smaller than any other fully connected object boundary. As another possibility, the back-end computing platform 601 may determine, from the one or more fully-connected object boundaries, a final object boundary having a largest number of overlapping boundaries with other fully-connected object boundaries. The final object boundary may then be assigned to an object class that corresponds to the intersected object in the 3D model. Other examples are also possible.

More information about tracing intersections of cross-section planes and objects and connecting line segments to form discrete boundaries can be found in U.S. patent application Ser. No. 17/592,278, filed on Feb. 3, 2022 and titled "Connecting Line Segments," the contents of which are incorporated herein by reference in their entirety.

After identifying the objects that fall within the scope of the clash detection request and determining their discrete 2D boundaries within the 2D view, the back-end computing platform 601 may compare the respective 2D boundaries of those identified objects to identify any intersection between the 2D boundaries. Any identified intersection between 2D object boundaries is then identified as a clash and may be presented at an end-user device for viewing by a user, as further discussed below.

In some situations, comparing respective 2D boundaries of objects within the 2D view to identify any intersections might not detect certain types of clashes. For instance, if one discrete 2D object boundary is contained entirely within another discrete 2D object boundary, a clash between those two objects in the 3D model may exist-however, the 2D boundaries may not physically intersect with each other in the frame of reference represented by the 2D view. For this reason, the back-end computing platform 601 may, after determining the discrete 2D boundary for each object within the 2D view, "fill in" the 2D boundaries to determine "filled-in" 2D boundaries for the objects within the 2D view. In this way, the objects within the 2D view may be treated as solid objects for the purposes of clash detection whereby any intersection or overlap within the 2D boundaries of two or more objects within the 2D view may be identified.

Figure 8B:
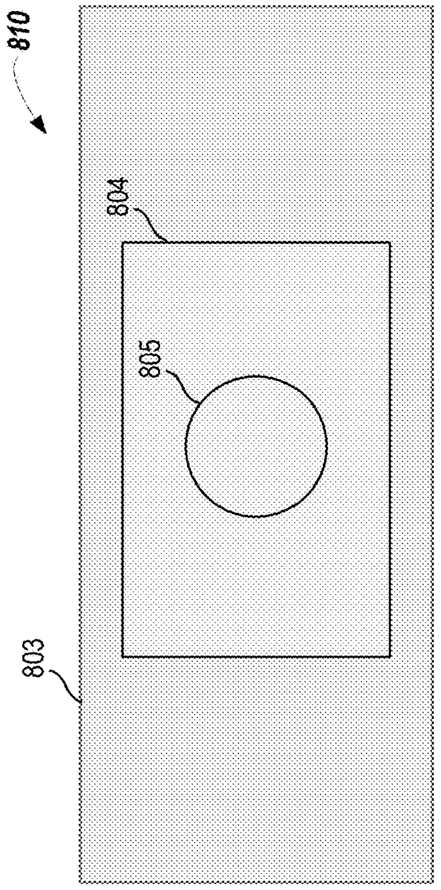
FIG. 8B depicts an example view of two-dimensional boundaries generated in accordance with aspects of the disclosed technology.
Figure 8C:
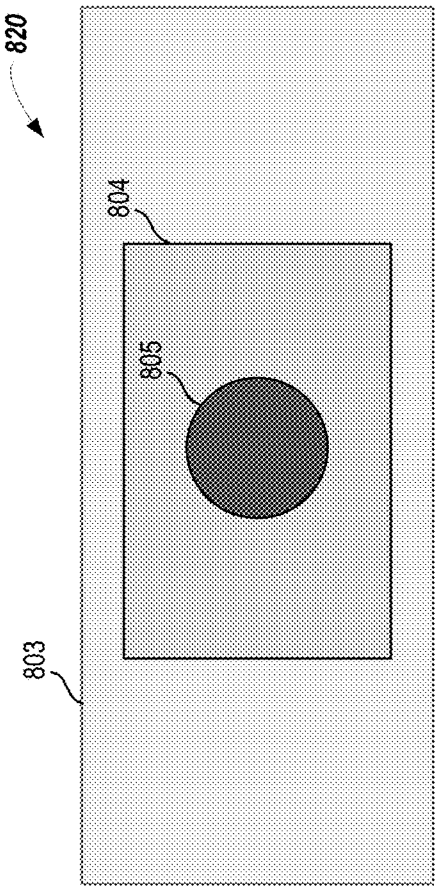
FIG. 8C depicts another example view of two-dimensional boundaries generated in accordance with aspects of the disclosed technology.
Figure 8A:
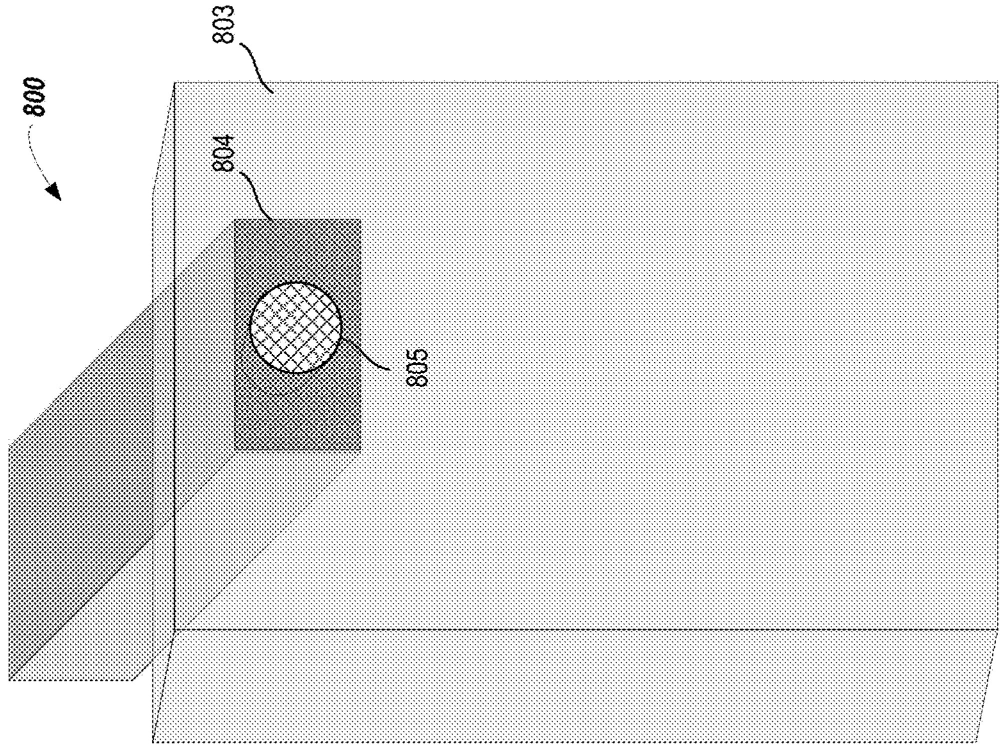
FIG. 8A depicts an example view comprising a portion of a three-dimensional model.

To illustrate with a practical example, consider the 3D view shown in FIG. 8A. FIG. 8A shows an example view 800 of a portion of a 3D model of a construction project that includes an intersection between a wall 803, an HVAC register 804, and a speaker 805. A construction professional may input a clash detection request that defines a cross-sectional plane along a surface of the wall 803 that intersects with the HVAC register 804 and the speaker 805. In line with the discussion above, the back-end computing platform 601 may trace the intersection of (i) the cross-sectional plane along the surface of the wall 803 and (ii) the HVAC register 804 and the speaker 805 to determine a discrete 2D boundary for each of the HVAC register 804 and the speaker 805. FIG. 8B depicts an example illustration 810 of these discrete 2D boundaries for the HVAC register 804 and the speaker 805. As shown in FIG. 8B, the 2D boundary of the speaker 805 fits entirely within the 2D boundary of the HVAC register 804. An analysis of the boundaries of these objects as shown in FIG. 8B (i.e., treating the boundaries as hollow objects) may not identify a clash between the HVAC register 804 and the speaker 805 because the boundaries do not intersect. However, "filling in" the hollow boundaries to define the equivalent of solid 2D boundaries as described above for each of the HVAC register 804 and the speaker 805 enables clashes between the two objects to be identified more accurately. FIG. 8C depicts an example illustration 820 that depicts the HVAC register 804 and the speaker 805 after their discrete 2D boundaries have been filled in. As shown in FIG. 8C, the HVAC register 804 and the speaker 805 are now each defined by a respective "filled in" 2D boundary.

It should be understood that the filled-in boundaries may not be visually depicted within the 2D view that is presented to the construction professional. For instance, the back-end computing platform 601 may define the filled-in boundaries internally. Moreover, the back-end computing platform 601 may not generate an actual solid, filled-in boundary for each 2D object. Rather, the back-end computing platform 601 may search for intersections between 2D objects in a way that contemplates the entire bounding area that is encompassed by (i.e., filled in by) the 2D object. In this respect, as one possibility, the back-end computing platform 601 may employ a search accelerator for spatial data, such as a tree data structure (e.g., R-tree, etc.) or a grid data structure (e.g., Uniform Grid, etc.), among other possibilities. The back-end computing platform 601 may employ other approaches as well. Based on the stored data defining the filled-in boundaries (e.g., a respective set of pixels, a respective set of coordinates, and/or a respective polygon that defines each discrete 2D boundary) for the objects that fall within the scope of the clash detection request, the back-end computing platform 601 may then perform the clash detection analysis by comparing the filled-in boundaries of objects within the 2D view.

Further, it should be understood that the back-end computing platform 601 may fill in boundaries for less than all of the objects within the 2D views. For example, in one implementation, the back-end computing platform 601 may determine which objects fall within the scope of the clash detection request after defining the discrete 2D boundaries and before filling in any of the 2D boundaries. For instance, after defining the 2D boundaries for the objects within the 2D view, the back-end computing platform 601 may obtain information about each object defined by its respective 2D boundary to determine whether or not that object falls within the scope of the clash detection request. Then, the back-end computing platform 601 may fill in only the respective 2D boundaries of those objects that fall within the scope of the clash detection request.

In any case, the back-end computing platform 601 may identify the objects within the 2D view that fall within the scope of the clash detection request, which may involve analyzing the characteristics of each object in the 2D view (e.g., evaluating metadata associated with each object indicating an object type, object class, etc.) to determine which objects meet the criteria defined by the scope of the clash detection request.

After identifying the objects that fall within the scope of the clash detection request, the back-end computing platform 601 may perform the clash detection analysis by comparing the respective (filled-in) 2D boundaries of those identified objects to identify any clashes between objects within the 2D view, as discussed above.

The back-end computing platform 601 may then send information about each identified clash to the end-user device 603. In turn, the end-user device 603 may display an indication of each identified clash in the 2D view. In one implementation, an indication of a clash may take the form of a visual representation that may be selectable to obtain information about the clash. Further, in some implementations, the visual representation may be selectable to obtain information about one or more actions that may be performed with respect to the clash. For instance, selecting the visual representation may cause the 2D view to be updated with actions for resolving the clash, flagging the clash, or sharing information about the clash, as some examples. Further yet, in some implementations, the 2D view may provide an option to view a portion of the 3D model of the construction project that corresponds to the 2D view and/or a particular clash indicated in the 2D view. Further still, in some implementations, the 2D view may provide an option to view recommended solutions for resolving a clash indicated in the 2D view. More information about clash resolution can be found in U.S. patent application Ser. No. 18/194,451 filed on Mar. 31, 2023 and titled "Computer Systems and Methods for Intelligent Clash Detection and Resolution," which is incorporated by reference herein in its entirety.

Figure 9A:
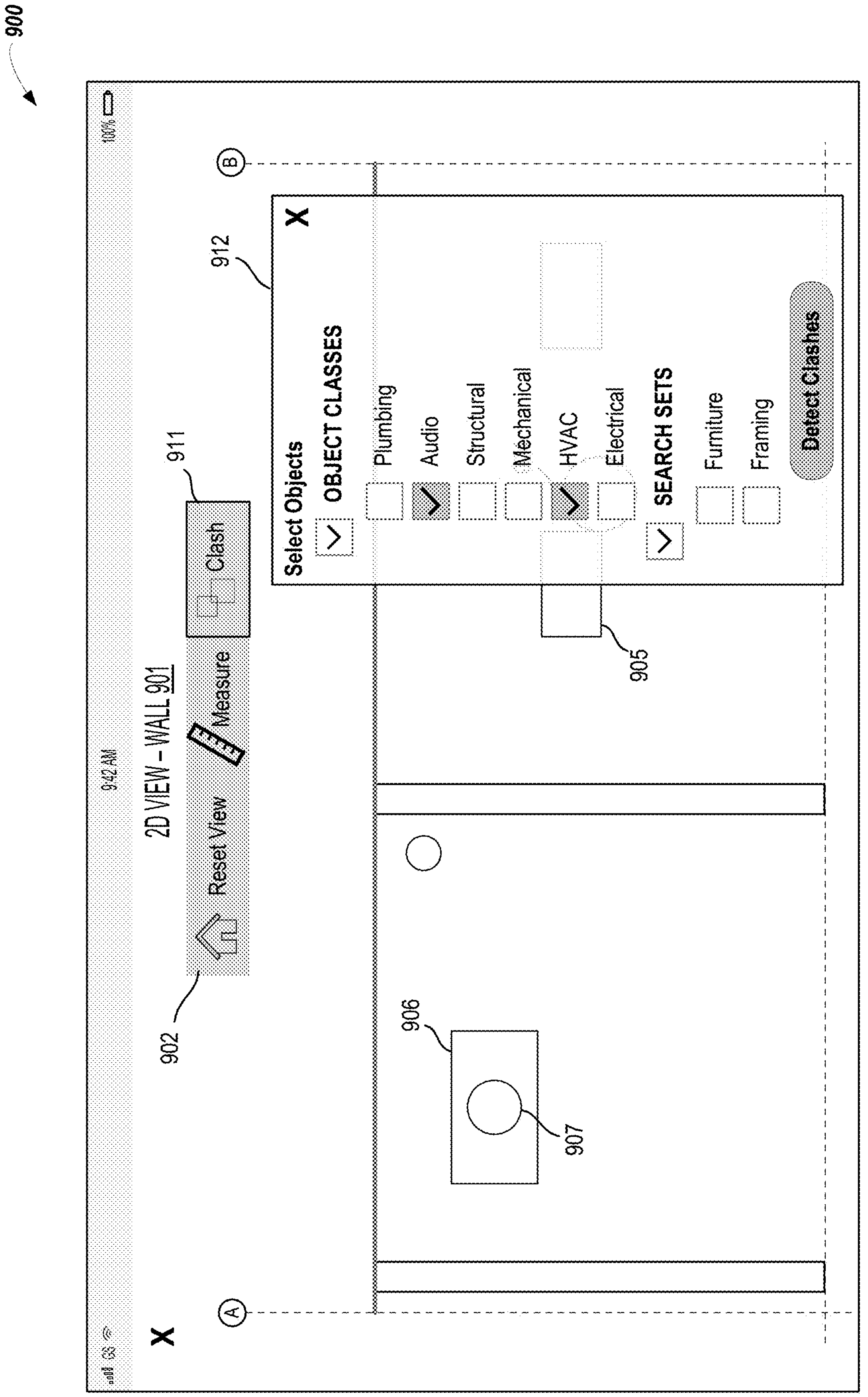
FIG. 9A depicts an example two-dimensional cross-sectional view that may be generated for two-dimensional clash detection in accordance with aspects of the disclosed technology.
Figure 9B:
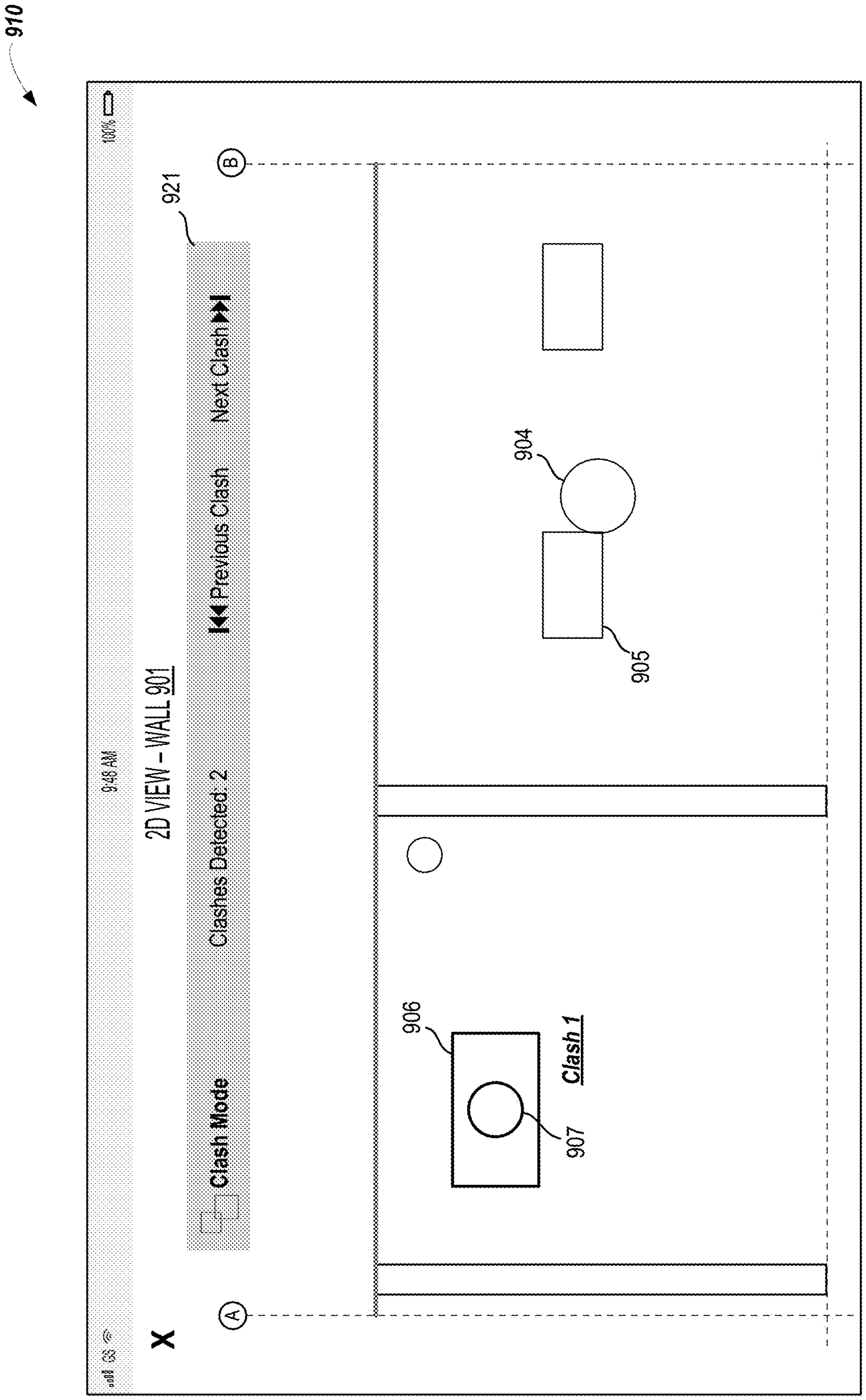
FIG. 9B depicts another two-dimensional cross-sectional view that may be generated for two-dimensional clash detection in accordance with aspects of the disclosed technology.
Figure 9C:
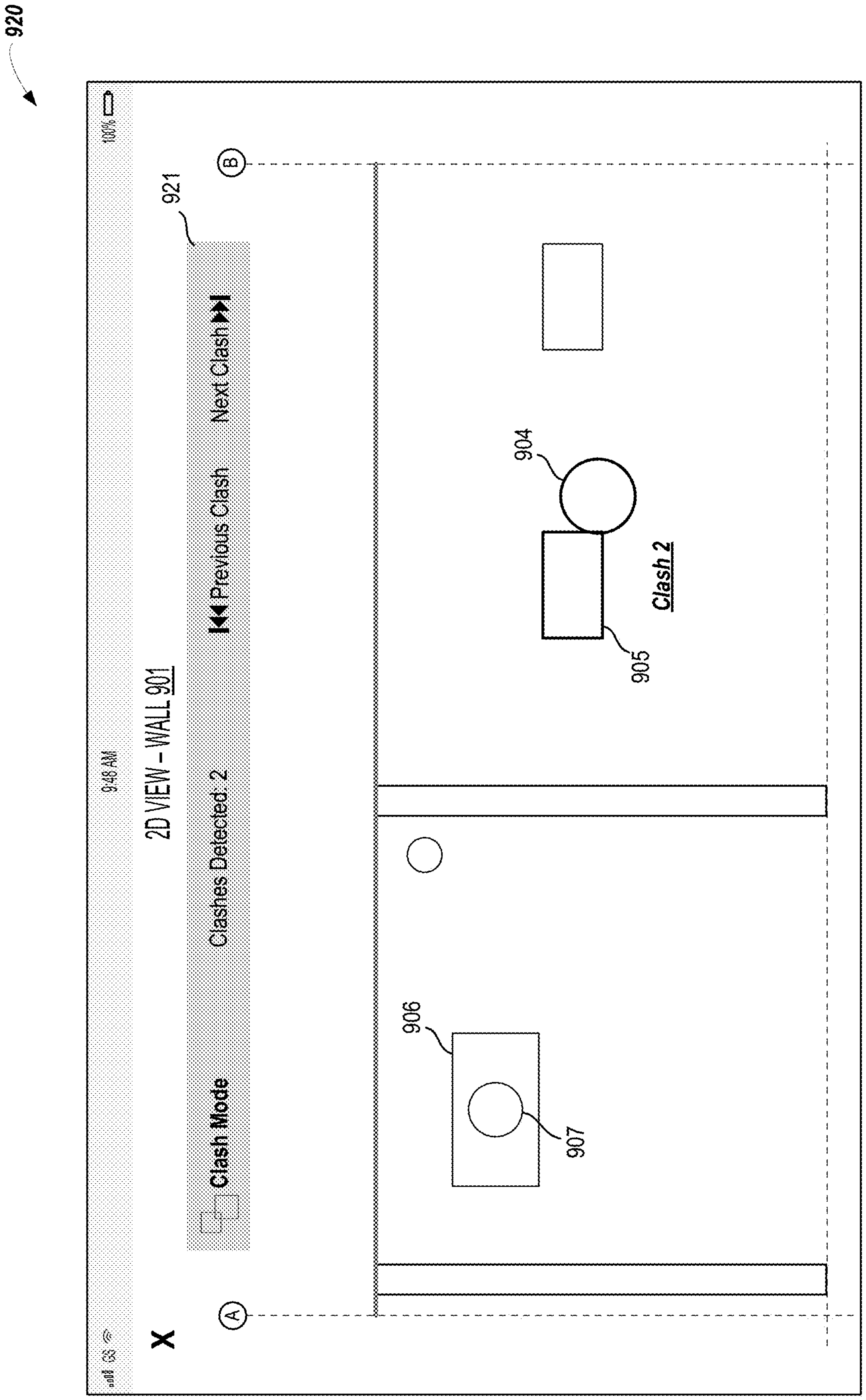
FIG. 9C depicts yet another two-dimensional cross-sectional view that may be generated for two-dimensional clash detection in accordance with aspects of the disclosed technology.

FIGS. 9A-9C depict example user interface views that may be presented in line with the discussion above.

With reference first to FIG. 9A, an example two-dimensional cross-sectional view 900 is shown. In practice, the view 900 may have been generated based on a user-defined cross-sectional plane within a portion of a 3D model of a construction project. For instance, in line with the discussion above, a construction professional may have input a request to generate the 2D cross-sectional view 900 from a 3D model of a given construction project. For example, as one possibility, the construction professional may have accessed a software tool for generating 2D views of the 3D model and indicated a given portion of the 3D model based on which to generate a 2D view. As another possibility, the construction professional may have accessed a previously generated 2D view. For instance, the construction professional may have resumed viewing a 2D view that the construction professional requested in a previous viewing session. As yet another example, the construction professional may have accessed a software tool for viewing the 3D model of the given construction project and selected an option to view a 2D view of the given portion of the 3D model.

As shown in FIG. 9A, the view 900 depicts an intersection of a cross-sectional plane along a wall 901. Further, the view 900 includes a pane 902 including various selectable options that may each cause the end-user device 603 and/or the back-end computing platform 601 to perform certain actions. The example of FIG. 9A indicates selection of an option to launch a "Clash" software tool 911 that may have been selected by the construction professional to initiate a clash detection session. The view 900 further includes a pane 912 that may have been presented in response to selection of the software tool 911.

As shown in FIG. 9A, the pane 912 enables the construction professional to provide user input indicating the scope for the clash detection request, which may take any of various forms as discussed above. In the example of FIG. 9A, the pane 912 includes one or more options that may be selected to collectively define the scope for the clash detection request. For instance, the construction professional may wish to view clashes between certain classes of objects, such as objects that are part of an audio system and objects that are part of an HVAC system of the given construction project. Therefore, the construction professional may select respective options to indicate that objects within an "Audio" object class and an "HVAC" object class should be included in the clash detection analysis. In line with the discussion above, the pane 912 may also include options to define the scope in other ways, such as by selecting a search set. The pane 912 may additionally comprise an option to exit the pane 912, as indicated by a selectable exit button, and an option to initiate clash detection, as indicated by a selectable "Detect Clashes" button that may be selected after the construction professional has completed defining the scope for the clash detection request.

In response to detecting a selection of the option to initiate clash detection, the end-user device 603 may transmit to the back-end computing platform 601 an indication of the clash detection request, along with data defining the scope of the request, which may collectively form the input 604 provided to the clash detection subsystem 605.

Based on the clash detection request provided as the input 604, the clash detection subsystem 605 may perform a clash detection analysis to identify one or more clashes between objects in the 2D view being displayed at the end-user device 603. The function of performing a clash detection analysis in accordance with the disclosed technology may take various forms.

In one implementation, after receiving the input 604, the clash detection subsystem 605 may define a discrete (filled-in) 2D boundary for each object within the 2D view, in line with the discussion above. Based on the defined 2D boundaries, the clash detection subsystem 605 may then identify each object within the 2D view that falls within the scope of the clash detection request. For instance, as mentioned above, the clash detection subsystem 605 may interact with one or more other subsystems to obtain information (e.g., metadata) about each object within the 2D view and then identify those objects that meet the scope criteria. After identifying the objects that fall within the scope of the clash detection request (e.g., "in-scope" objects), the clash detection subsystem 605 may compare the discrete 2D boundaries of the in-scope objects to determine if there are any clashes between those objects.

In some implementations, the clash detection subsystem 605 may identify each instance of intersection or overlap between respective boundaries of two (or more) objects as a discrete clash. The clash detection subsystem 605 may identify clashes in other ways as well.

After performing the clash detection analysis based on the clash detection request, the clash detection subsystem 605 may provide an output 608 indicating the results of the clash detection analysis. The output 608 may take various forms. As one possibility, the output 608 may comprise information indicating a listing of each identified clash and a respective identifier of each object involved in the clash. As another possibility, the output 608 may comprise information indicating each identified clash and each object involved in the clash. As yet another possibility, if the clash detection subsystem detected no clashes, the output 608 may comprise information indicating that no clashes were detected within the 2D view based on the scope of the clash detection request. The output 608 may take other forms as well.

The clash detection subsystem 605 may provide the output 608 to at least the end-user device 603. In some implementations, the clash detection subsystem 605 may provide the output 608 to one or more subsystems 607. For instance, as one example, the output 608 may be provided to a subsystem that is configured to log information about all detected clashes. As another example, the output 608 may be provided to a subsystem for notification to one or more given user accounts associated with other construction professionals involved on the construction project. For instance, a general contractor of the construction project may wish to be notified each time certain types of clashes are detected. Other examples are also possible.

In line with the discussion above, based on receiving the output 608 from the back-end computing platform 601, the end-user device 603 may display an indication of the output 608. For instance, in one implementation, the end-user device 603 may update the currently-displayed 2D view to include an indication of the output 608. The indication may take various forms. For example, as one possibility, the representation may take the form of a selectable visual representation of each identified clash in the 2D view. As another possibility, the indication may take the form of a selectable listing of each identified clash and a respective identifier of each object involved in the clash that is presented to the user in the form of a pane or pop-up menu overlaid on the 2D view. The indication may take other forms as well.

FIG. 9B depicts an example view 910 of a 2D view that includes an indication of detected clashes. The view 910 may be presented after the construction professional has submitted the clash detection request discussed above with reference to FIG. 9A. As shown in FIG. 9B, the view 910 may include an updated pane 921 which indicates (i) that a clash detection mode is currently active, (ii) a number of clashes that were detected based on the submitted clash detection request, and (iii) navigation controls to navigate between the identified clashes that are indicated in the 2D view 910.

As mentioned above, the respective indications of each identified clash may be selectable to obtain information about the clash and/or perform various actions related to the clash. For instance, as one possibility, an indication of a clash may be selectable to view information about each object indicated in the clash. As another possibility, an indication of a clash may be selectable to view one or more actions that may be performed with respect to the clash. For instance, the construction professional may select one or more options that enable the user to add a comment for a given clash, save the given clash, share the given clash with another user, and/or resolve the given clash (e.g., by selecting an option to launch a software tool for revising project plans, etc.). Other examples are also possible.

In some implementations, an indication of a given clash may be emphasized in a particular way. For example, an indication of a given clash may be emphasized to indicate that the given clash is currently selected. For instance, in the example of FIG. 9B, the representations of the objects 906 and 907 are emphasized in bold outline and accompanied by an identifier "Clash 1," indicating that the clash between those two objects is currently selected. As another example, respective indications of identified clashes may be emphasized to differentiate the identified clashes from other objects displayed within the 2D view. The indications of the identified clashes may be emphasized in other ways as well.

The navigation controls may facilitate navigating between identified clashes within the 2D view. In this respect, the identified clashes may be organized according to a sequence (e.g., from left to right, top to bottom, etc.), and the navigation controls may facilitate navigating between the identified clashes in accordance with the sequence. For instance, selecting a first control option may cause a first clash that is currently-selected to be de-selected and may cause a second clash that immediately precedes the first clash according to the sequence to become selected. Similarly, selecting a second control option may cause a first clash that is currently-selected to be de-selected and may cause a second clash that immediately follows the first clash according to the sequence to become selected.

In the example of FIG. 9B, where the clash between the objects 906 and 907 is selected, the construction professional may select the "Next Clash" navigation control to automatically de-select the clash between the objects 906 and 907 and select a different clash in accordance with some sequence as discussed above (e.g., left to right as depicted in the 2D view 910). In turn, the end-user device 603 may display an example view 920 shown in FIG. 9C, wherein the clash between the objects 906 and 907 is no longer selected, and the clash between the objects 904 and 905 is selected instead, as indicated by the objects 904 and 905 being depicted in bold outline and accompanied by an identifier "Clash 2." The construction professional may select the "Previous Clash" navigation control in the view 920 to return to the clash between the objects 906 and 907 as shown in FIG. 9B.

The disclosed software technology for two-dimensional clash detection further enables dynamic clash detection. For instance, in some implementations, the clash detection subsystem 605 may be configured to perform new iterations of the clash detection analysis based on the clash detection request while the clash detection mode is active in response to a trigger event, which may take various forms. As one possibility, the trigger event may comprise a user input indicating an adjustment to a generated 2D view, in which case the clash detection subsystem 605 may perform a new clash detection iteration each time the 2D view is adjusted. For instance, the construction professional may provide one or more user inputs to adjust a 2D view (e.g., to zoom in or out, to pan along an x- or y-axis, etc.), thereby causing the displayed 2D view to be updated dynamically in response to the user inputs (e.g., causing the end-user device 603 to dynamically generate an updated view based on each adjustment). In turn, the clash detection subsystem 605 may perform iterations of the clash detection analysis to identify any new clashes that are now contained with the 2D view, output information about the new clashes, and cause the end-user device 603 to update the 2D view to include indications of the new clashes in line with the discussion above.

Further, in some implementations, the 2D view may continue to retain some form of indication of identified clashes even as the perspective of the 2D view changes. For instance, if the construction professional zooms out of the view 920 shown in FIG. 9C, one or more of the objects 904, 905, 906, or 907 may become obscured. However, an indication of each clash shown in the view 920 may continue to be included, perhaps on an increasingly smaller scale, or in a pop-up pane, etc. so as to continue to indicate the clashes even as the construction professional adjusts the 2D view being displayed and the 2D view is dynamically updated.

Advantageously, such dynamic clash detection may be particularly useful in situations where a construction professional wishes to view the impact of a particular clash in the context of a different view. For instance, with reference to the view 920 of FIG. 9C, the construction professional may wish to pan up to view a section of the construction project above a ceiling intersecting the wall 901, perhaps to see how the HVAC register 906 connects to the rest of the HVAC system for the construction project.

In some implementations, as mentioned above, the clash detection subsystem 605 may interact with a clash resolution subsystem in order to obtain one or more possible solutions for a given clash. For instance, the clash detection subsystem 605 may provide the clash resolution subsystem with information about one or more identified clashes and request a respective solution for resolving each clash. The clash resolution subsystem may be configured to (ii) analyze information about each object involved in a clash, perhaps along with available historical clash resolution data, and (iii) based on the analysis, determine a solution for resolving the identified clash. For each identified clash, the clash resolution subsystem may return a determined solution to the clash detection subsystem 605. In turn, the clash detection subsystem 605 (or another subsystem of the back-end computing platform 601) may cause the end-user device 603 to display respective indications of the resolutions for the identified clashes. More information can be found in U.S. patent application Ser. No. 18/194,451 previously incorporated above.

Figure 10:
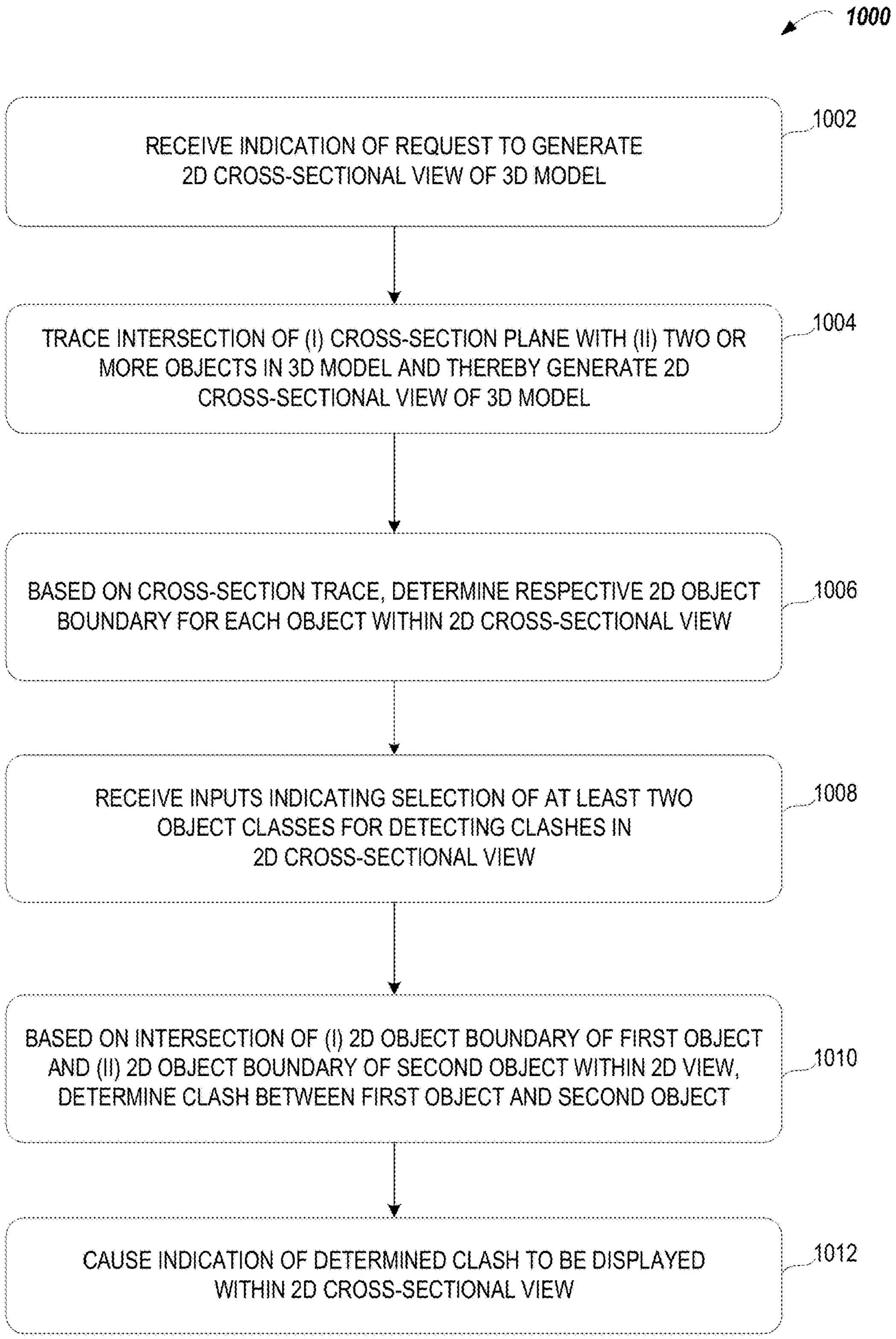
FIG. 10 depicts a flowchart of an example process that may be carried out to facilitate two-dimensional clash detection in accordance with aspects of the disclosed technology.

Turning now to FIG. 10, a flow chart of an example process in accordance with one embodiment of the disclosed technology is shown. FIG. 10 includes one or more operations, functions, or actions as illustrated by one or more operational blocks. Although the blocks are illustrated in a given order, some of the blocks may also be performed in parallel, and/or in a different order than those described herein. Also, the various blocks may be combined into fewer blocks, divided into additional blocks, and/or removed based upon the desired implementation.

In addition, for the flowchart shown in FIG. 10 and any other processes and methods disclosed herein, the flowchart shows functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIG. 10 may represent circuitry and/or machinery that is wired or arranged to perform the specific functions in the process.

Furthermore, in the examples below, the operations discussed in relation to FIG. 10 may be described as being performed by a certain computing platform in communication with at least one end-user device, such as the back-end computing platform 101 in communication with an end-user device 103 shown in FIG. 1, or the back-end computing platform 601 in communication with the end-user device 603 shown in FIG. 6. However, it should be understood that any of the operations discussed herein might be carried out by some combination of a back-end computing platform and/or an end-user device, or even by an end-user device alone.

FIG. 10 depicts a flowchart of an example process 1000 that illustrates one example implementation of operations that may be carried out to facilitate two-dimensional clash detection in accordance with the software technology disclosed herein. Although steps 1002-1012 are illustrated in sequential order, these steps may also be performed in parallel, and/or in a different order than those described herein. Also, the various steps may be combined into fewer steps, divided into additional steps, and/or removed based upon the desired implementation.

The example process 1000 may begin at block 1002, where the back-end computing platform may receive an indication of a request to generate a cross-sectional 2D view of a 3D model of a construction project. In line with the discussion above, the request to generate the 2D view may take various forms, and may indicate a cross-sectional plane that intersects two or more objects in the 3D model.

At block 1004, based on the request, the back-end computing platform may generate the 2D view, which may involve tracing the intersection of the cross-sectional plane and the two or more objects, in line with the discussion above.

At block 1006, based on the trace performed at block 1004, the back-end computing platform may determine a respective 2D object boundary for each object within the 2D view. In some implementations, in line with the discussion above, this function may involve determining a respective 2D object boundary for each object and then filling in the 2D object boundaries to define a respective filled-in 2D boundary for each object.

At block 1008, the back-end computing platform may receive an indication of at least two object classes for detecting clashes within the 2D view. For instance, in line with the discussion above, the back-end computing platform may receive, from an end-user device associated with a user, an indication of two object classes selected by the user based on which to detect clashes within the 2D view. In some implementations, in line with the discussion above, the indication of the at least two object classes may be included within the indication of the request received at block 1002.

After receiving a scope for the clash detection request, the back-end computing platform may then perform the clash detection analysis. For example, the back-end computing platform may analyze the respective discrete 2D boundaries of in-scope objects within the 2D view to determine if there are any object clashes, which may take various forms as discussed above. For instance, at block 1008, the back-end computing platform may identify a clash between a first object and a second object within the two-dimensional view based on an intersection of (i) a respective 2D boundary of the first object and (ii) a respective 2D boundary of the second object.

At block 1010, the back-end computing platform may cause each identified clash to be indicated within the cross-sectional 2D view, as generally discussed in the examples above. The example process 1000 comprises example operations that may be performed in accordance with one embodiment of automated 2D clash detection as disclosed herein. In line with the discussion above, operations for undertaking automated 2D clash detection may take other forms as well.

VI. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

We claim:

1. A computing platform comprising:

at least one processor;

a non-transitory computer-readable medium; and program instructions stored on the non-transitory computer-readable medium that are executable by the at least one processor such that the computing platform is configured to:

receive, from an end-user device associated with a user, an indication of a request to generate a two-dimensional (2D) cross-sectional view of a three-dimensional (3D) model of a construction project;

generate the requested 2D cross-sectional view of the 3D model by:

tracing respective intersections of (i) a cross-section plane with (ii) respective 3D meshes representing two or more objects in the 3D model; and based on tracing the respective intersections, determining a respective 2D object boundary for each of the two or more objects;

receive an indication of user input defining at least two object classes for which to detect clashes between objects of the 3D model that are represented within the 2D cross-sectional view;

based on the user input:

identify, from the objects of the 3D model that are represented within the 2D cross-sectional view, a set of objects that are within the at least two object classes; and evaluate whether there are any intersections between respective 2D object boundaries of objects in the identified set of objects and thereby determine that there is an intersection between (i) a first 2D object boundary of a first object of the 3D model that is in the identified set of objects and (ii) a second 2D object boundary of a second object of the 3D model that is in the identified set of objects;

based on the determined intersection between (i) the first 2D object boundary of the first object and (ii) the second 2D object boundary of the second object, identify a clash between the first object and the second object of the 3D model; and cause the end-user device to display a respective indication of the identified clash.

2. The computing platform of claim 1, wherein the program instructions that are executable by the at least one processor such that the computing platform is configured to determine the respective 2D object boundary for each of the two or more objects comprise program instructions that are executable by the at least one processor such that the computing platform is configured to:

for each object:

based on the respective intersection of the cross-section plane with the 3D mesh representing the object, determine a plurality of 2D line segments of the object that each define a respective portion of a boundary of the object for the cross-section plane, wherein each line segment comprises a pair of end points;

for each line segment of the object, based on (i) a threshold distance and (ii) at least one respective distance between an end point of the line segment and an end point of another line segment of the object, determine a respective set of nearby line segments;

determine one or more fully-connected object boundaries by progressively connecting respective sets of nearby line segments in series;

determine, from the one or more fully-connected object boundaries, a final object boundary to be used as a discrete 2D boundary of the object; and add the final object boundary to the cross-sectional view as the respective 2D object boundary of the object.

3. The computing platform of claim 1, further comprising program instructions stored on the non-transitory computer-readable medium that are executable by the at least one processor such that the computing platform is configured to:

determine an object class for each of the two or more objects.

4. The computing platform of claim 1, further comprising program instructions stored on the non-transitory computer-readable medium that are executable by the at least one processor such that the computing platform is configured to:

for the first object, fill in the first 2D object boundary, wherein the program instructions that are executable by the at least one processor such that the computing platform is configured to identify the clash between the first object and the second object comprise program instructions that are executable by the at least one processor such that the computing platform is configured to:

determine that the second 2D object boundary of the second object intersects the filled-in first 2D object boundary of the first object.

5. The computing platform of claim 1, wherein the request to generate the 2D cross-sectional view of the 3D model of the construction project comprises a user selection of a given object in the 3D model.

6. The computing platform of claim 5, wherein the given object is a floor, a ceiling, or a wall.

7. The computing platform of claim 5, further comprising program instructions stored on the non-transitory computer-readable medium that are executable by the at least one processor such that the computing platform is configured to:

based on receiving the indication of the request to generate the 2D cross-sectional view of the 3D model that comprises the user selection of the given object, generate suggestions of object class pairs for which to perform a clash detection analysis; and cause the end-user device to display the generated suggestions of object class pairs.

8. The computing platform of claim 7, wherein the program instructions that are executable by the at least one processor such that the computing platform is configured to receive the indication of user input defining at least two object classes for which to detect clashes between objects of the 3D model that are represented within the 2D cross-sectional view comprise program instructions that are executable by the at least one processor such that the computing platform is configured to:

receive an indication of a user selection of two object classes from the generated suggestions of object class pairs.

9. The computing platform of claim 1, further comprising program instructions stored on the non-transitory computer-readable medium that are executable by the at least one processor such that the computing platform is configured to:

receive, from the end-user device, an indication of a request to identify clashes between objects within the 2D cross-sectional view; and based on the request, cause the end-user device to display a view for receiving the user input defining the at least two object classes for which to detect clashes.

10. The computing platform of claim 1, wherein the respective indication of the identified clash comprises a respective selectable representation, the computing platform further comprising program instructions stored on the non-transitory computer-readable medium that are executable by the at least one processor such that the computing platform is configured to:

determine that the respective selectable representation of the identified clash has been selected; and cause the end-user device to display one or both of (i) information about each object involved in the identified clash, or (ii) selectable options for facilitating performance of one or more actions related to the identified clash.

11. A non-transitory computer-readable medium, wherein the non-transitory computer-readable medium is provisioned with program instructions that, when executed by at least one processor, cause a computing platform to:

receive, from an end-user device associated with a user, an indication of a request to generate a two-dimensional (2D) cross-sectional view of a three-dimensional (3D) model of a construction project;

generate the requested 2D cross-sectional view of the 3D model by:

tracing respective intersections of (i) a cross-section plane with (ii) respective 3D meshes representing two or more objects in the 3D model; and based on tracing the respective intersections, determining a respective 2D object boundary for each of the two or more objects;

receive an indication of user input defining at least two object classes for which to detect clashes between objects of the 3D model that are represented within the 2D cross-sectional view;

based on the user input:

identify, from the objects of the 3D model that are represented within the 2D cross-sectional view, a set of objects that are within the at least two object classes; and evaluate whether there are any intersections between respective 2D object boundaries of objects in the identified set of objects and thereby determine that there is an intersection between (i) a first 2D object boundary of a first object of the 3D model that is in the identified set of objects and (ii) a second 2D object boundary of a second object of the 3D model that is in the identified set of objects;

based on the determined intersection between (i) the first 2D object boundary of the first object and (ii) the second 2D object boundary of the second object, identify a clash between the first object and the second object of the 3D model; and cause the end-user device to display a respective indication of the identified clash.

12. The non-transitory computer-readable medium of claim 11, wherein the program instructions that, when executed by the at least one processor, cause the computing platform to determine the respective 2D object boundary for each of the two or more objects comprise program instructions that, when executed by the at least one processor, cause the computing platform to:

for each object:

based on the respective intersection of the cross-section plane with the 3D mesh representing the object, determine a plurality of 2D line segments of the object that each define a respective portion of a boundary of the object for the cross-section plane, wherein each line segment comprises a pair of end points;

for each line segment of the object, based on (i) a threshold distance and (ii) at least one respective distance between an end point of the line segment and an end point of another line segment of the object, determine a respective set of nearby line segments;

determine one or more fully-connected object boundaries by progressively connecting respective sets of nearby line segments in series;

determine, from the one or more fully-connected object boundaries, a final object boundary to be used as a discrete 2D boundary of the object; and add the final object boundary to the cross-sectional view as the respective 2D object boundary of the object.

13. The non-transitory computer-readable medium of claim 11, further comprising program instructions stored on the non-transitory computer-readable medium that, when executed by the at least one processor, cause the computing platform to:

determine an object class for each of the two or more objects.

14. The non-transitory computer-readable medium of claim 11, further comprising program instructions stored on the non-transitory computer-readable medium that, when executed by the at least one processor, cause the computing platform to:

for the first object, fill in the first 2D object boundary, wherein the program instructions that, when executed by at least one processor, cause the computing platform to identify the clash between the first object and the second object comprise program instructions that, when executed by at least one processor, cause the computing platform to:

determine that the second 2D object boundary of the second object intersects the filled-in first 2D object boundary of the first object.

15. The non-transitory computer-readable medium of claim 11, wherein the request to generate the 2D cross-sectional view of the 3D model of the construction project comprises a user selection of a given object in the 3D model.

16. The non-transitory computer-readable medium of claim 15, wherein the given object is a floor, a ceiling, or a wall.

17. A method carried out by a computing platform, the method comprising:

receiving, by the computing platform, from an end-user device associated with a user, an indication of a request to generate a two-dimensional (2D) cross-sectional view of a three-dimensional (3D) model of a construction project;

generating, by the computing platform, the requested 2D cross-sectional view of the 3D model by:

tracing respective intersections of (i) a cross-section plane with (ii) respective 3D meshes representing two or more objects in the 3D model; and based on tracing the respective intersections, determining a respective 2D object boundary for each of the two or more objects;

receiving, by the computing platform, an indication of user input defining at least two object classes for which to detect clashes between objects of the 3D model that are represented within the 2D cross-sectional view;

based on the user input:

identifying, by the computing platform, from the objects of the 3D model that are represented within the 2D cross-sectional view, a set of objects that are within the at least two object classes; and evaluating, by the computing platform, whether there are any intersections between respective 2D object boundaries of objects in the identified set of objects and thereby determining that there is an intersection between (i) a first 2D object boundary of a first object of the 3D model that is in the identified set of objects and (ii) a second 2D object boundary of a second object of the 3D model that is in the identified set of objects;

based on the determined intersection between (i) the first 2D object boundary of the first object and (ii) the second 2D object boundary of the second object, identifying, by the computing platform, a clash between the first object and the second object of the 3D model; and causing, by the computing platform, the end-user device to display a respective indication of the identified clash.

18. The method of claim 17, wherein determining, by the computing platform, the respective 2D object boundary for each of the two or more objects comprises:

for each object:

based on the respective intersection of the cross-section plane with the 3D mesh representing the object, determining a plurality of 2D line segments of the object that each define a respective portion of a boundary of the object for the cross-section plane, wherein each line segment comprises a pair of end points;

for each line segment of the object, based on (i) a threshold distance and (ii) at least one respective distance between an end point of the line segment and an end point of another line segment of the object, determining a respective set of nearby line segments;

determining one or more fully-connected object boundaries by progressively connecting respective sets of nearby line segments in series;

determining, from the one or more fully-connected object boundaries, a final object boundary to be used as a discrete 2D boundary of the object; and adding the final object boundary to the cross-sectional view as the respective 2D object boundary of the object.

19. The method of claim 17, further comprising:

determining, by the computing platform, an object class for each of the two or more objects.

20. The method of claim 17, further comprising:

based on the first 2D object boundary, generating, by the computing platform, a filled-in first 2D object boundary of the first object, wherein identifying, by the computing platform, the clash between the first object and the second object of the 3D model comprises determining that the second 2D object boundary of the second object intersects the filled-in first 2D object boundary of the first object.

* * * * *